(12) United States Patent
Ono

(10) Patent No.: US 11,352,238 B2
(45) Date of Patent: Jun. 7, 2022

(54) ATTACHMENT TO BE MOUNTED TO DISTAL END OF WORK VEHICLE ARM, WORK VEHICLE EQUIPPED WITH ATTACHMENT, AND BRAKE FOR ATTACHMENT

(71) Applicant: YUUGENGAISHA UESUTO KOUGYOU YAZU, Tottori (JP)

(72) Inventor: Kenichi Ono, Tottori (JP)

(73) Assignee: YUUGENGAISHA UESUTO KOUGYOU YAZU, Tottori (JP)

(*) Notice: Subject to any disclaimer, the term of this patent is extended or adjusted under 35 U.S.C. 154(b) by 421 days.

(21) Appl. No.: 16/309,447

(22) PCT Filed: Jul. 18, 2017

(86) PCT No.: PCT/JP2017/025909
§ 371 (c)(1),
(2) Date: Dec. 12, 2018

(87) PCT Pub. No.: WO2018/016472
PCT Pub. Date: Jan. 25, 2018

(65) Prior Publication Data
US 2019/0202671 A1    Jul. 4, 2019

(30) Foreign Application Priority Data

Jul. 19, 2016  (JP) .............................. JP2016-141108
May 1, 2017   (JP) .............................. JP2017-091005
Jun. 27, 2017  (JP) .............................. JP2017-125106

(51) Int. Cl.
*B66C 13/08*  (2006.01)
*B66C 1/44*   (2006.01)
(Continued)

(52) U.S. Cl.
CPC .............. *B66C 13/08* (2013.01); *A01G 23/00* (2013.01); *B66C 1/42* (2013.01); *B66C 1/44* (2013.01); *F16D 49/00* (2013.01); *F16D 51/10* (2013.01)

(58) Field of Classification Search
CPC ........... B66C 13/08; B66C 1/44; B66C 3/005; F16D 49/00
(Continued)

(56) References Cited

U.S. PATENT DOCUMENTS 3,231,303 A * 1/1966 Letourneau ............... B66C 3/18
                                                            294/192
3,631,995 A * 1/1972 Jones ........................ B66C 3/20
                                                            414/731
(Continued)

FOREIGN PATENT DOCUMENTS

CN    200984738 Y    12/2007
CN    104947731 A    9/2015
(Continued)

OTHER PUBLICATIONS

International Search Report in PCT/JP2017/025909, dated Oct. 24, 2017, 2pp.

*Primary Examiner* — Paul T Chin
(74) *Attorney, Agent, or Firm* — Hauptman Ham, LLP

(57) ABSTRACT

The purpose of the present invention is to provide a safe device with which, by forcibly braking the rotation of a grapple by means of an external force, it is possible even for an unskilled operator to bring the rotation to a halt and further to prevent accidents due to such rotation. Another purpose of the present invention is to provide such a device at lower cost. According to the present invention, a grapple has a lower frame that has claws for gripping timber and an upper frame that rotatably holds the lower frame, and is (Continued)

provided with a rotation braking means that applies a brake on the rotation of the lower frame.

9 Claims, 18 Drawing Sheets

(51) Int. Cl.
    *B66C 1/42*     (2006.01)
    *A01G 23/00*     (2006.01)
    *F16D 49/00*     (2006.01)
    *F16D 51/10*     (2006.01)

(58) Field of Classification Search
    USPC .............................. 294/86.41, 119.4; 188/83
    See application file for complete search history.

(56) References Cited

U.S. PATENT DOCUMENTS

| | | | | |
|---|---|---|---|---|
| 3,651,966 | A * | 3/1972 | Willett | B66C 3/16 |
| | | | | 414/735 |
| 3,759,564 | A * | 9/1973 | Seaberg | B66C 3/16 |
| | | | | 294/198 |
| 3,782,567 | A * | 1/1974 | Likas | B60P 1/483 |
| | | | | 414/555 |
| 3,902,614 | A * | 9/1975 | Roberts | B66C 3/16 |
| | | | | 414/735 |
| 3,908,695 | A * | 9/1975 | Dunbar | B66C 1/24 |
| | | | | 137/580 |
| 3,989,150 | A * | 11/1976 | Stephenson | B66C 13/08 |
| | | | | 414/740 |
| 4,005,894 | A * | 2/1977 | Tucek | B66C 3/16 |
| | | | | 294/198 |
| 4,005,895 | A * | 2/1977 | Cullings | B66C 3/005 |
| | | | | 294/65.5 |
| 4,017,114 | A * | 4/1977 | LaBounty | B66C 3/16 |
| | | | | 294/197 |
| 4,958,981 | A * | 9/1990 | Uchihashi | E02F 3/3677 |
| | | | | 294/86.41 |
| 5,451,087 | A * | 9/1995 | Beaulieu | A01G 23/006 |
| | | | | 188/83 |
| 5,601,161 | A | 2/1997 | Brigden | |
| 7,721,857 | B2 * | 5/2010 | Harr | B66C 3/005 |
| | | | | 188/381 |
| 2009/0057019 | A1 * | 3/2009 | LaValley | E21B 19/20 |
| | | | | 175/85 |
| 2014/0028042 | A1 * | 1/2014 | LaValley | E21B 19/14 |
| | | | | 294/198 |

FOREIGN PATENT DOCUMENTS

| | | |
|---|---|---|
| JP | H6-240702 A | 8/1994 |
| JP | H8-73180 A | 3/1996 |
| JP | 2000-69866 A | 3/2000 |
| JP | 2001-336171 A | 12/2001 |
| JP | 2007-186886 A | 7/2007 |
| JP | 2007186886 * | 7/2007 |
| JP | 2008-308327 A | 12/2008 |
| JP | 2009-91757 A | 4/2009 |
| JP | 3162428 U | 9/2010 |
| JP | 2012-19702 A | 2/2012 |
| JP | 3186220 U | 9/2013 |

\* cited by examiner

ATTACHMENT TO BE MOUNTED TO DISTAL END OF WORK VEHICLE ARM, WORK VEHICLE EQUIPPED WITH ATTACHMENT, AND BRAKE FOR ATTACHMENT

RELATED APPLICATIONS

The present application is a National Phase of International Application Number PCT/JP2017/025909, filed Jul. 18, 2017, which claims priority to JP2016-141108 filed Jul. 19, 2016, JP2017-091005 filed May 1, 2017 and JP2017-125106 filed Jun. 27, 2017.

TECHNICAL FIELD

The present invention relates to an attachment to be mounted to a distal end of work vehicle arm, a work vehicle including the attachment, and a brake for the attachment, and more particularly to an attachment including rotation braking means for braking the rotation of a lower frame, a work vehicle including the attachment, and a brake for the attachment to be used retrofitted to the attachment.

BACKGROUND ART

In forestry, when timber is loaded on a truck, a work vehicle comprising an attachment called a grapple disposed on a distal end of an arm thereof is used. The grapple generally includes a rotation mechanism because timber needs to be aligned in a predetermined orientation before the timber is loaded on a truck bed. As the driving source for the rotation mechanism, a hydraulic motor as disclosed in Patent Literatures 1 to 3 is generally used.

In addition, the grapple holds timber by claws that are opened and closed by a hydraulic cylinder. The cylinder for use in opening and closing the claws is generally disposed near the claws. For example, in FIG. 6 of Patent Literature 4, one hydraulic cylinder is directly connected to a pair of claws. In FIG. 1 of Patent Literature 5, one hydraulic cylinder is connected to one of the claws via a link and the other claw is linked with the one of the claws via the link.

The claws of the grapple disclosed in Patent Literature 4 and 5 cannot be rotated. However, there must be cases in which the claws need to be rotated to align timber held by the claws before the timber is loaded on a truck. In order to rotate the claws, oil needs to be supplied to the hydraulic cylinder for opening and closing the claws even while the claws are rotated.

In light of this, there has been considered a method of supplying oil to the cylinders using an oil swivel joint. In FIG. 2 of Patent Literature 1 as a general method, a pair of cylinders are directly connected to a pair of claws, and oil is supplied to the rotating cylinders through a swivel joint arranged coaxially with a rotational axis of the claws.

In FIG. 2 of Patent Literature 6 as a special method, the cylinders arranged coaxially with the rotational axis of the claws open and close the claws by the coaxial shaft and link, and oil is supplied to the rotating cylinders through the coaxial swivel joint. The cylinder rod itself does not rotate relative to the cylinder, thus timber or the like held by the claws can be rotated even if the cylinder rod axis is coaxial with the rotational axis of the claws.

CITATION LIST

Patent Literature

[Patent Literature 1] Japanese Patent Laid-Open No. 2001-336171
[Patent Literature 2] Japanese Utility Model Registration No. 3186220
[Patent Literature 3] Japanese Patent Laid-Open No. 2012-19702
[Patent Literature 4] Japanese Patent Laid-Open No. 2008-308327
[Patent Literature 5] Japanese Patent Laid-Open No. 2009-91757
[Patent Literature 6] Japanese Patent Laid-Open No. 8-73180

SUMMARY OF INVENTION

Technical Problem

The grapple rotated by a hydraulic motor is expensive because of its complicated structure as disclosed in Patent Literature 1 to 3.

In the case of a grapple driven by a hydraulic motor, the rotation of timber does not stop immediately due to the moment of inertia of the timber even if an operation is performed to apply braking to the rotation. For this reason, the rotation stop operation needs to be performed in consideration of the moment of inertia. The moment of inertia of the timber varies depending on the weight, shape, and gripping location of the timber, and thus the rotation stop operation requires considerable skill.

Patent Literature 2 discloses means for stopping the rotation function, but the stopping of the rotation function only ends up stopping driving the rotation by controlling supplying of oil and does not forcibly stop the rotation by an external force. In other words, the stopping means disclosed in Patent Literature 2 does not continue an unrotatable state after the rotation is stopped.

Therefore, in the case where even if the grapple is caused to stop rotating, the center of gravity of the timber is located at a position away from the grapple (for example, in the case of holding one side of the timber), the timber may enter a gradually rotating state due to a change in hydraulic pressure or the like. For this reason, the timber hits the driving operation room or the work vehicle body.

In view of this, an object of the present invention is to provide a safe device allowing even a less skilled operator to easily stop rotation of a grapple by forcibly stopping the rotation thereof by means of an external force and capable of preventing accidents due to rotation. Further, another object of the present invention is to be able to fix such a safe device in a necessary position. Furthermore, still another object of the present invention is to provide a lesser expensive device.

Further, the grapple disclosed in Patent Literature 1 and Patent Literature 6 uses a swivel joint because the hydraulic cylinder for opening and closing the claws rotates as the claws rotate. The swivel joint is, however, expensive and complicated in structure, leading to a concern about a failure of the swivel joint for use in the grapple with a large load or a large hydraulic pressure.

In view of this, still another object of the present invention is to provide a less expensive and simplified grapple not having a swivel joint by preventing the hydraulic cylinder for opening and closing the claws from rotating even if the claws rotate.

Solution to Problem

In order to achieve the above object, an attachment to be mounted to a distal end of work vehicle arm of the present invention is an attachment to be mounted to a distal end of work vehicle arm having a lower frame holding a workpiece and an upper frame rotatably holding the lower frame, wherein the attachment comprises rotation braking means for braking rotation of the lower frame.

The attachment can quickly stop rotating the workpiece held by the lower frame thereof to the desired angle and after the rotation stops, can continue an unrotatable state until the rotation braking means is released. Thus, the attachment can reduce accidents, such as where the workpiece rotating with moment of inertia hits a machine, a truck, or the like. Further, the attachment can reliably quickly stop rotating the lower frame and thus can shorten working time. Furthermore, the attachment of the present invention can be fixed in the necessary position, allowing even a low-skilled operator to perform attachment work such as loading timber on a truck.

Further, the configuration of the present invention can eliminate the need for rotation drive means to rotate the lower frame. For example, a common grapple as the attachment uses rotation drive means having a hydraulic motor to rotate the lower frame. The rotation drive means is, however, a very expensive device. Therefore, the grapple like the present invention includes rotation braking means, but does not include rotation drive means, and thus is very less expensive. Note that when timber is loaded on a truck using a grapple without rotation drive means, the timber can be rotated by an operation technique of moving the grapple while keeping the gripped timber in contact with a fall prevention rod or the like of the truck. Note also that timber can be rotated by human power.

Further, the attachment to be mounted to a distal end of work vehicle arm of the present invention is preferably such that the rotation braking means is a retrofit brake. If the rotation braking means is a retrofit brake, the retrofit brake can be used simply by attaching the retrofit brake to an existing attachment, allowing the braking function to be imparted to the attachment at very low cost.

Further, the attachment to be mounted to a distal end of work vehicle arm of the present invention is preferably such that an adapter having a surface press-contacted by the rotation braking means is disposed on the lower frame. A change in the distance between the exposed surface of the rotating lower frame and a brake prevents the brake from being applied. In this case, an adapter may be mounted on the lower frame so that the distance between the exposed surface and the brake is constant. This can apply braking to the rotation of the attachment at low cost. This function is effective in many places where a hydraulic motor is used.

Examples of the attachment of the present invention include an attachment called lifting magnet which is common in demolition sites etc., and the present invention can be widely applied to an attachment whose lower frame is rotatable.

Further, the attachment to be mounted to a distal end of work vehicle arm of the present invention is preferably such that the lower frame has claws for gripping the workpiece and the attachment includes a grapple. Further, the grapple comprises: a first link mechanism which is connected to the claws; a shaft portion which is connected to the first link mechanism, which is coaxial with a rotational axis of the claws, and which slides in the axial direction to open and close the claws; and a cylinder which applies a sliding force to the shaft portion directly or through a second link mechanism in the axial direction, wherein the shaft portion comprises a rotating portion which causes the first link mechanism side to be rotatable relative to the cylinder side.

Since the shaft portion comprises the rotating portion, the cylinder for use in rotating the claws does not rotate even if the claws rotate. This eliminates the need for an expensive swivel joint for the claw opening/closing cylinder, and thus can provide a less expensive grapple with a simplified structure.

Further, the attachment to be mounted to a distal end of work vehicle arm of the present invention is preferably such that the cylinder is an existing packet cylinder of a work vehicle pivotally supported on the arm and is connected to the shaft portion via the second link mechanism. The use of the existing packet cylinder can help provide a less expensive attachment.

Further, the attachment to be mounted to a distal end of work vehicle arm of the present invention is preferably such that the cylinder is directly connected to the shaft portion. Since the existing packet cylinder of the work vehicle is not used for opening and closing the claws, the claws can be opened and closed regardless of the bending movement of the grapple by the packet cylinder.

In order to achieve the above object, a work vehicle of the present invention is a work vehicle comprising an attachment having a lower frame holding a workpiece and an upper frame rotatably holding the lower frame, wherein the attachment comprises rotation braking means for braking rotation of the lower frame.

Further, the work vehicle of the present invention preferably comprises motor drive means for rotating the lower frame and motor drive stopping means for stopping driving the motor drive means by causing the rotation braking means to apply braking to the rotation. This prevents a large load from being applied to the motor drive means and the rotation braking means, thus capable of preventing damage of at least one of the motor drive means and the rotation braking means.

The work vehicle of the present invention is preferably such that the rotation braking means comprises: a brake which is held on the upper frame or the lower frame and which is applied by pressing the lower frame or the upper frame; and a pedal which operates the brake in a direction of applying the braking, and the motor drive stopping means comprises a sensor detecting a movement of the pedal, and stops driving the motor drive means based on the detection of the sensor.

The work vehicle of the present invention is preferably such that the rotation braking means comprises: a brake which is held on the upper frame or the lower frame and which is applied by pressing the lower frame or the upper frame; and a pedal which operates the brake in a direction of releasing the braking, and the motor drive stopping means comprises a sensor detecting a movement of the pedal, and allows driving of the motor drive means based on the detection of the sensor.

In order to achieve the above object, a brake for attachment of the present invention is preferably such that the brake is retrofitted to an attachment having a lower frame holding a workpiece and an upper frame rotatably holding the lower frame, and is used as rotation braking means of the attachment. The brake for attachment of the present invention allows the rotation braking means to be easily mounted on an existing attachment at low cost by attaching it to the existing attachment whose lower frame is rotatable.

DESCRIPTION OF EMBODIMENTS

Figure 1A:
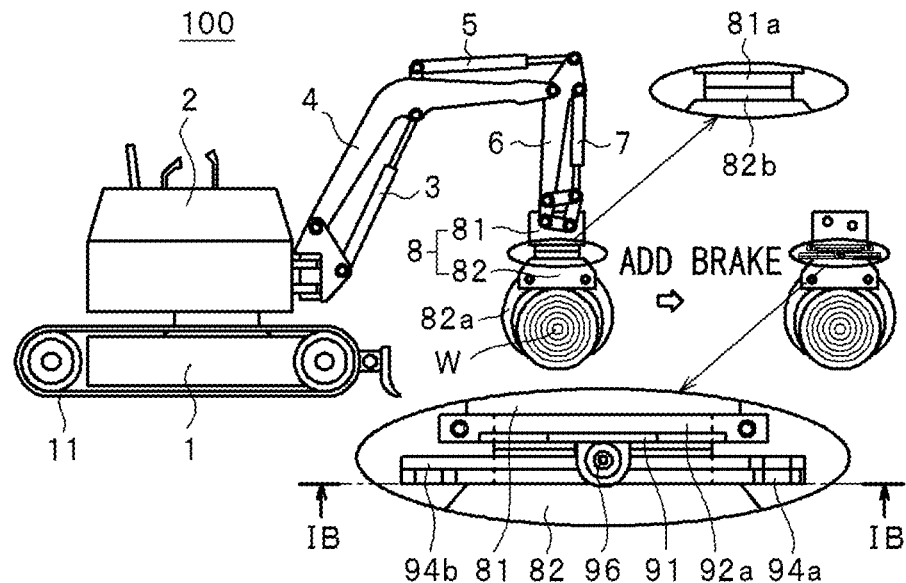
FIG. 1A is a side view illustrating a main configuration of a first embodiment.

Hereinafter, modes for carrying out the present invention will be described with reference to embodiments and drawings. It should be noted that the following embodiments do not limit the present invention. The present invention can be equally applied to a case where various modifications have been made without departing from the technical idea defined in the claims of the present invention. Further, in each drawing, each member is displayed at different scales so that each member can be recognized on the drawing, resulting in that the dimensions are not necessarily displayed in proportion to the actual dimensions.

First Embodiment

The configuration of a grapple 8 and a work vehicle 100 including the grapple 8 according to a first embodiment of the present invention will be described with reference to FIG. 1A, FIG. 1B and FIG. 2. The work vehicle 100 is a vehicle which grips timber W or the like and moves the gripped timber W onto a truck, a timber storage site, or the like. Note that the work vehicle 100 is not limited to be used for forestry. The work vehicle 100 can be used at any places, such as construction sites and demolition sites.

Figure 1B:
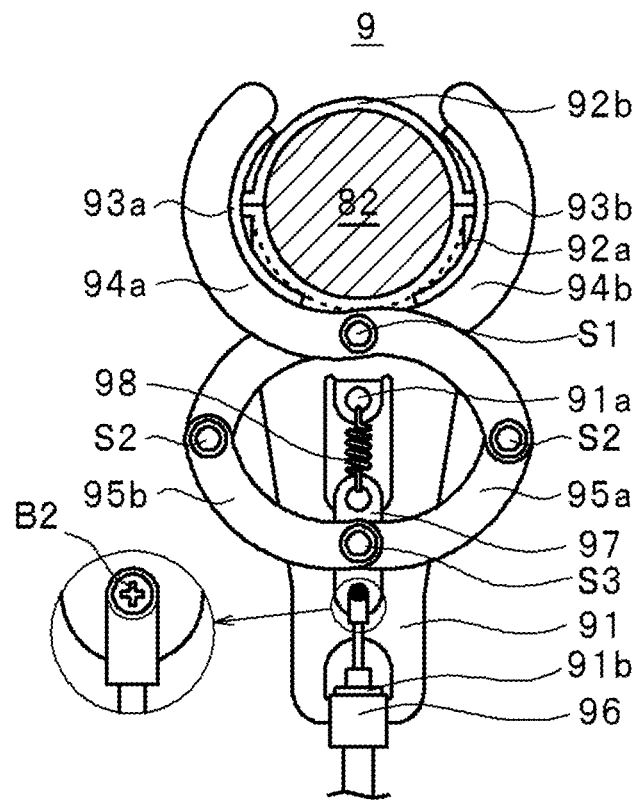
FIG. 1B is a sectional view along line IB-IB of FIG. 1A illustrating a configuration of a brake.

As illustrated in FIG. 1A, the work vehicle 100 includes a traveling body 1 which travels on a rubber crawler 11; a rotating body 2 which is pivotally supported on the traveling body 1 and rotatable; a boom 4 which is pivotally supported on the rotating body 2 and bendable by a hydraulic boom cylinder 3; an arm 6 which is pivotally supported on the boom 4 and bendable by a hydraulic arm cylinder 5; and a grapple 8 which is pivotally supported on the arm 6 and bendable by a hydraulic grapple cylinder 7.

The grapple 8 includes an upper frame 81 and a lower frame 82. The upper frame 81 rotatably pivotally supports the lower frame 82 by a built-in hydraulic motor (unillustrated). Further, the lower frame 82 includes a claw 82a for gripping timber W or the like, and is pivotally supported by the upper frame 81, and is driven to rotate by the hydraulic motor. Note that the grapple 8 is an example of various attachments mounted on a distal end of the arm 6 of the work vehicle 100. Note also that the timber W gripped by the claw 82a is also an example of the workpiece held by the attachment, and the workpiece may be a waste material or the like. Note also that the unillustrated hydraulic motor for rotating the lower frame 82 may be built in either the upper frame 81 or the lower frame 82.

Further, the grapple 8 includes a brake (rotation braking means) 9 for braking the rotation. The brake 9 of the present embodiment is rotation braking means retrofitted to the existing grapple 8.

The brake 9 will be described with reference to FIGS. 1B, 2A, and 2B. The brake 9 includes a chassis 91 serving as a substrate, first and second retaining rings 92a and 92b, a pair of shoes (pads) 93a and 93b pressed against a rotating body to be braked, a pair of linings 94a and 94b, a first shaft S1, a pair of links 95a and 95b, a brake wire 96, a second shaft S2, a connection plate 97, a third shaft S3, and a spring 98.

The first and second retaining rings 92a and 92b are connected by a screw B1 to form a ring shape. The shoes 93a and 93b are mounted on the pair of linings 94a and 94b respectively. The first shaft S1 rotatably pivotally supports the pair of linings 94a and 94b. The pair of links 95a and 95b decompose one force and apply component force to the pair of linings 94a and 94b. The brake wire 96 is for pulling the pair of links 95a and 95b. The second shaft S2 rotatably pivotally supports the pair of linings 94a and 94b and the pair of links 95a and 95b. The connection plate 97 is for connecting the brake wire 96 and the pair of links 95a and 95b. The third shaft S3 rotatably connects the connection plate 97 and the pair of links 95a and 95b. The spring 98 is for holding a standby state in which the shoes 93a and 93b do not contact the rotating body.

Then, a method of attaching the chassis 91 to the upper frame 81 will be described. The upper frame 81 includes a cylindrically exposed mounting surface 81a which is coaxial with the rotational axis of the lower frame 82 and which is located near the lower frame 82. Further, the lower frame 82 includes a cylindrically exposed press-contact surface 82b which is coaxial with the rotational axis of the lower frame 82 and which is located near the mounting surface 81a of the upper frame 81.

Figure 2A:
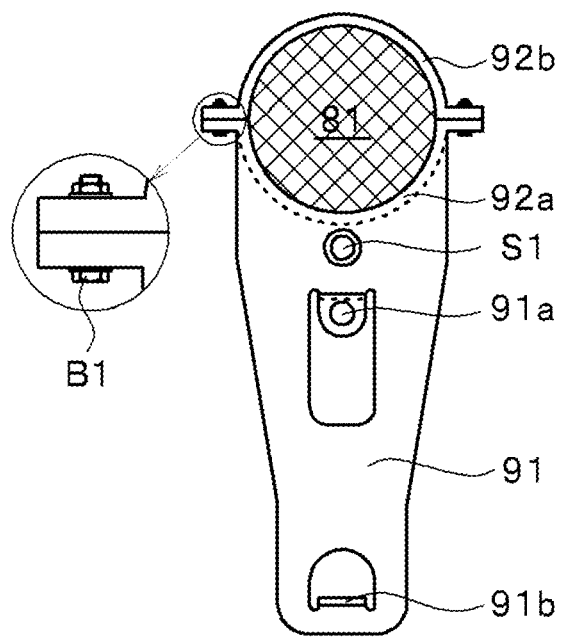
FIG. 2A is a side view illustrating a configuration of attaching the brake to a grapple.
Figure 2B:
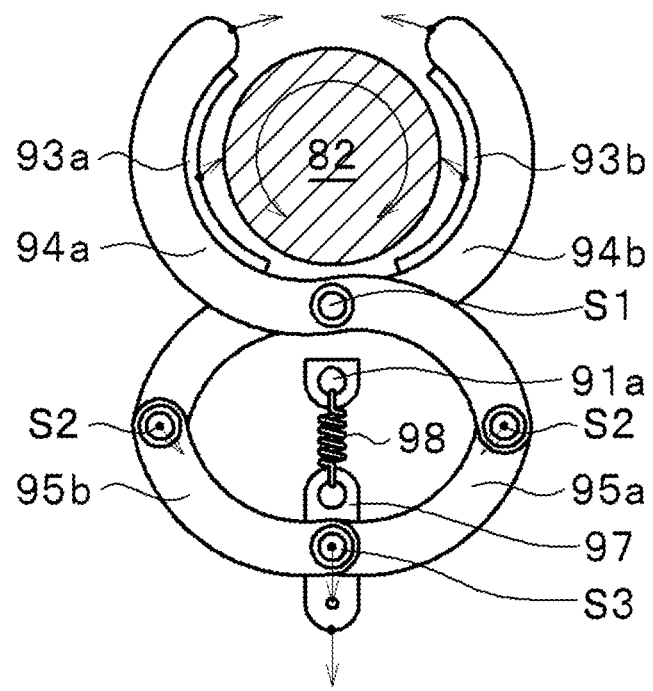
FIG. 2B is a bottom plan view describing the operation of the brake.

As illustrated in FIG. 2A, the first and second retaining rings 92a and 92b are screwed by the screw B1 with the mounting surface 81a sandwiched therebetween. Then, the chassis 91 is welded to the first retaining ring 92a, and the chassis 91 is mounted on the upper frame 81 by screwing the screw B1.

One end of the first shaft S1 is crimped to the chassis 91. Then, the linings 94a and 94b are fitted into the first shaft S1, and an E type retaining ring (generally called a C ring) is fitted into a groove of the first shaft S1. Thus, the linings 94a and 94b are rotatably pivotally supported on the chassis 91. The pair of pivotally supported linings 94a and 94b has a shape like scissors. The shoes 93a and 93b are fixed to one end of the linings 94a and 94b respectively. Then, the mounting height of the linings 94a and 94b is set so that the shoes 93a and 93b are positioned to face the press-contact surface 82b of the lower frame 82.

The other end of the linings 94a and 94b and one end of the links 95a and 95b are rotatably pivotally supported by the second shaft S2. Further, the other end of the links 95a and 95b and the connection plate 97 are rotatably pivotally supported by the third shaft S3. Then, the spring 98 is fixed to a spring fixing portion 91a formed in the chassis 91 to pull one end of the connection plate 97. Thus, the spring 98 holds a standby state in which the shoe 93a does not contact the rotating body. In other words, the third shaft S3 is pulled toward the first shaft S1, which widens the distance between the two second shafts S2, opens the scissor shape of the linings 94a and 94b, and resultingly expands and holds the interval between the two shoes 93a and 93b.

The brake wire 96 is fixed to the other end of the connection plate 97. A tube of the brake wire 96 (unillustrated) is engaged with a brake wire locking portion 91b so as to prevent the tube of the brake wire 96 from moving in the direction of the connection plate 97. Note that although unillustrated, the other end of the brake wire 96 is connected to a foot brake in a driver's seat of the rotating body 2, and is locked to prevent the tube of the brake wire 96 from moving toward the foot brake side. Thus, when the foot brake is pressed, the force causes the two shoes 93a and 93b to press the press-contact surface 82b of the lower frame 82, and thus can brake the rotation of the lower frame 82.

The rotation stopping method of the present invention is not a method of the ON/OFF control of the hydraulic motor which is a power source for rotation, but a method of using an external force of the brake 9 to forcibly brake the rotation of the lower frame 82. Thus, the work vehicle 100 can quickly stop rotating timber or the like gripped by the claws 82a of the grapple 8 to the desired angle. Further, after the rotation stops, the work vehicle 100 can maintain an unrotatable state until the pressing of the foot brake is stopped. Thus, the work vehicle 100 can reduce accidents, such as where the timber rotating with moment of inertia hits a machine, a truck, or the like even if the hydraulic motor is turned off.

Further, the work vehicle 100 needs not to wait until the timber rotating with moment of inertia stops, and thus can shorten working time. Furthermore, even for low-skilled persons who have not learned skilled operations such as turning off the hydraulic motor earlier in consideration of moment of inertia, the work vehicle 100 can help the low-skilled persons load the timber on a truck in a secure and easy manner. Furthermore, if the lower frame 82 has the press-contact surface 82b, the work vehicle 100 can have a very less expensive braking function simply by adding a retrofitted drum type brake.

Note that in the present embodiment, the chassis 91 of the brake 9 is mounted on the mounting surface 81a of the upper frame 81, the mounting position is not limited to this position, but the chassis 91 may be mounted on any other position of the upper frame 81. Note also that the present embodiment has described the rotation braking means using the drum-type brake 9 as the example, but the type of the brake is not limited to this type, but for example, a disk-type brake or the like may be used.

Second Embodiment

Then, a grapple 8B of a second embodiment will be described with reference to FIGS. 3A and 3B. It should be noted that in the grapple 8B of the second embodiment, the same reference characters or numerals are assigned to the components having the same configuration as those of the grapple 8 of the first embodiment, but a suffix "B" is added to the reference characters or numerals of the components having the same name but a different configuration. One of the major differences between the grapple 8B of the second embodiment and the grapple 8 of the first embodiment is the press-contact surface of the lower frame.

The lower frame 81B of the grapple 8B of the second embodiment does not have a cylindrical surface exposed coaxially with the rotational axis of the lower frame 82B. In other words, the lower frame 81B does not have a cylindrical surface corresponding to the press-contact surface 82b of the first embodiment. Therefore, first and second adapters 10a and 10b serving as different members from the lower frame 82B are mounted on the lower frame 81B to form a press-contact surface 10c exposed coaxially with the rotational axis of the lower frame 82B.

Figure 3A:
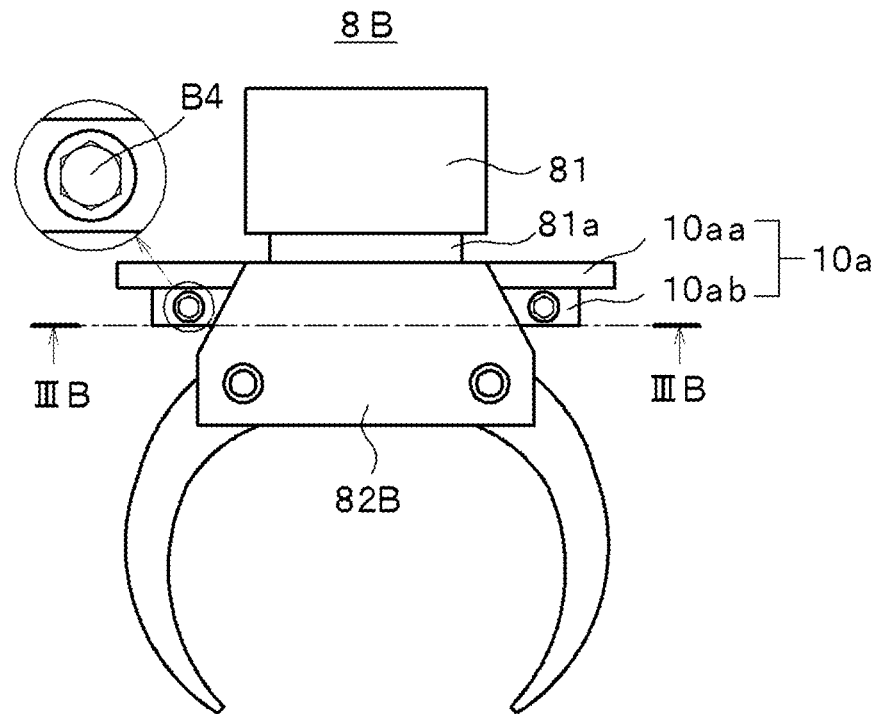
FIG. 3A is a plan view illustrating a configuration of attaching an adapter to a grapple of a second embodiment.
Figure 3B:
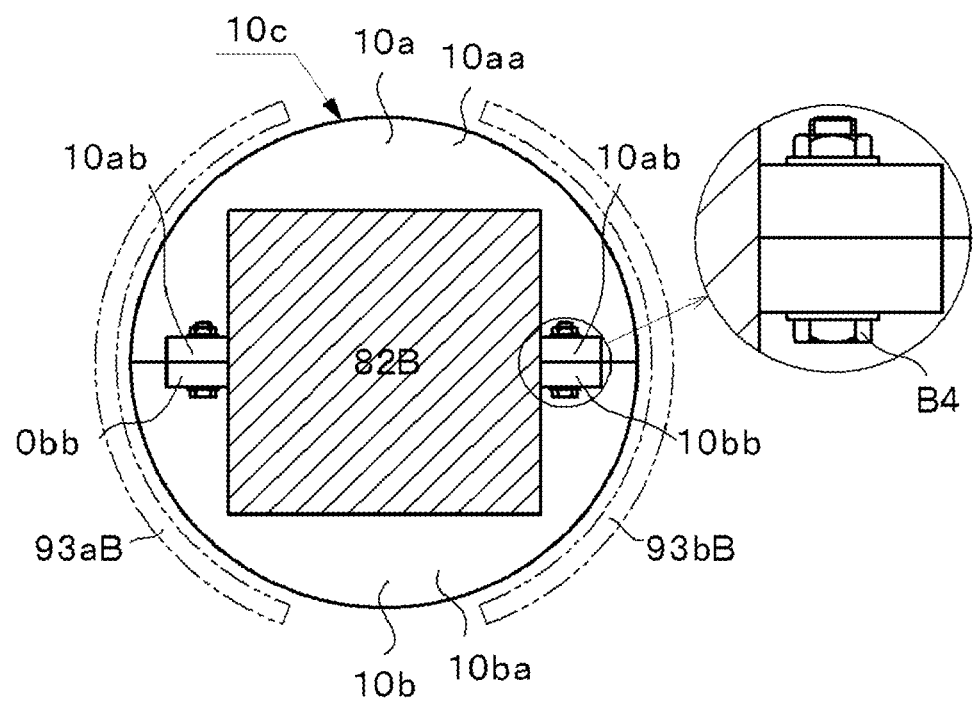
FIG. 3B is a sectional view along line IIIB-IIIB of FIG. 3A.

As illustrated in FIGS. 3A and 3B, first and second adapters 10a and 10b include first and second drums 10aa and 10ba, the two drums serving as the press-contact surface 10c of the cylindrical surface; and first and second ribs 10ab and 10bb crimped by the screws B4 with the lower frame 81B sandwiched therebetween. Thus, the grapple 8B can form the press-contact surface 10c by mounting the first and second adapters 10a and 10b onto the existing lower frame 81B and can brake the rotation of the grapple 8B by the press-contact of the first and second shoes 93aB and 93bB.

Note that the shape of the adapter is not limited to the shape of the present embodiment, but may be designed according to the shape of the lower frame of the existing grapple. Note also that in the case where a disk-type brake is used as the rotation braking means, the grapple may use such an adapter as a brake rotor to stop the rotation of the lower frame by sandwiching the adapter with pads.

Third Embodiment

Then, a grapple 8C of a third embodiment will be described with reference to FIGS. 4A and 4B. It should be noted that in the grapple 8C of the third embodiment, the same reference characters or numerals are assigned to the components having the same configuration as those of the grapple 8 of the first embodiment, but a suffix "C" is added to the reference characters or numerals of the components having the same name but a different configuration. The major differences between the grapple 8C of the third embodiment and the grapple 8 of the first embodiment are whether or not the brake is retrofitted, and whether or not there is a driving source (rotation drive means) such as a hydraulic motor for rotating the grapple.

Figure 4A:
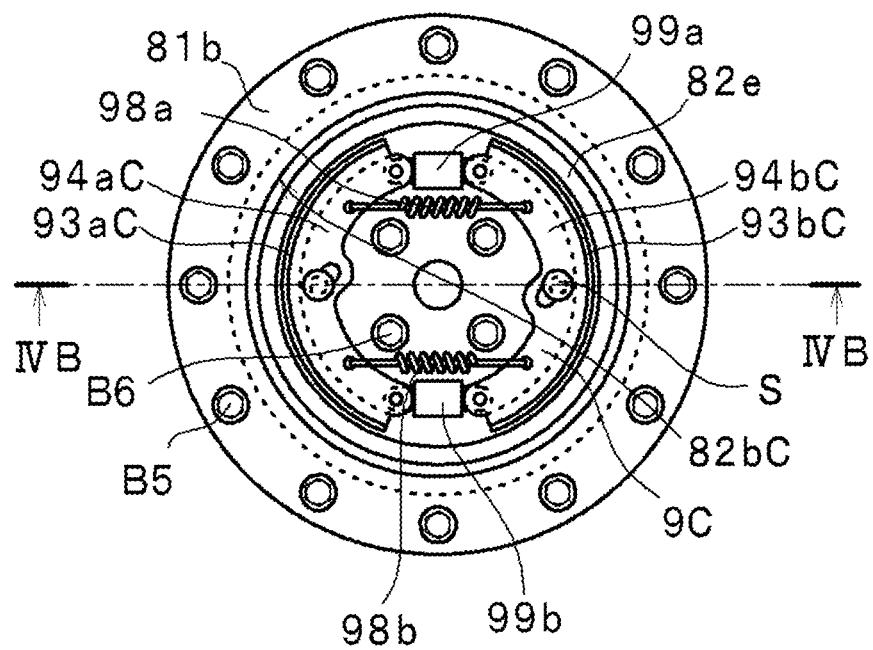
FIG. 4A is a plan view illustrating a configuration of a brake of a third embodiment.
Figure 4B:
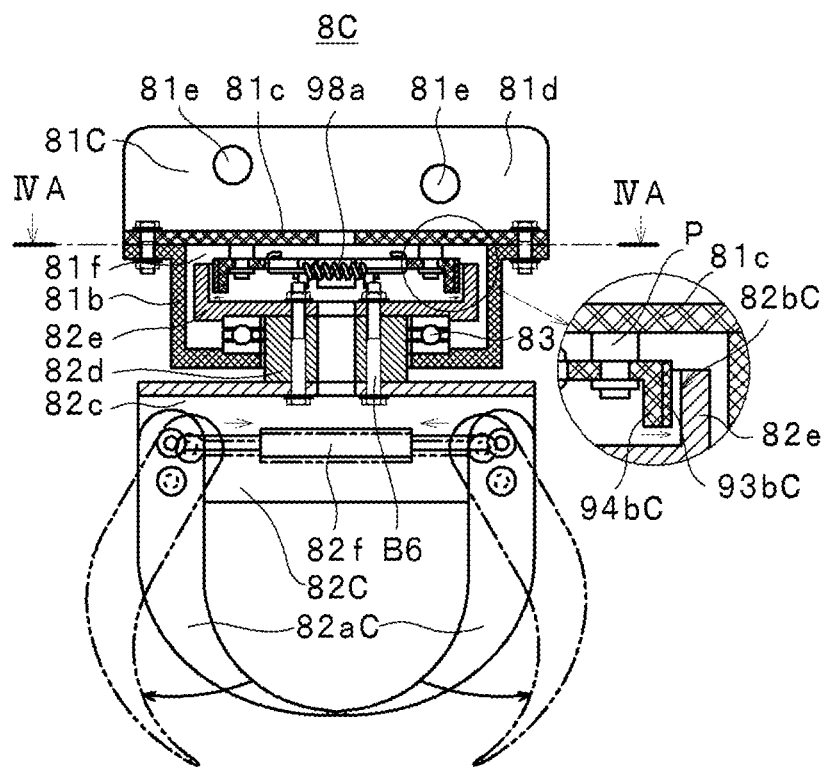
FIG. 4B is a sectional view along line IVB-IVB of FIG. 4A.

As illustrated in FIGS. 4A and 4B, the grapple 8C of the third embodiment includes an upper frame 81C and a lower frame 82C. The upper frame 81C includes a bottom lid 81b, an upper lid 81c screwed into the bottom lid 81b by the screws B5, a bearing 83 disposed in a hollow portion 81f formed by the bottom lid 81b and the bottom lid 81b, and a brake 9C. Two ribs 81d are standingly disposed on the upper lid 81c, and two mounting holes 81e are disposed on each rib. The grapple 8C can be mounted on the arm 6 of the work vehicle 100 as the attachment through the holes.

The lower frame 82C includes claws 82aC, a claw mounting bracket 82c, a claw cylinder 82f, a coupling shaft 82d, and a brake drum 82e. The claws 82a are rotatably mounted on the claw mounting bracket 82c. The claw cylinder 82f is a hydraulic cylinder for rotating the claws 82aC. The brake drum 82e is screwed to the claw mounting bracket 82c by the screw B6 with the coupling shaft 82d sandwiched therebetween, and is disposed in the hollow portion 81f of the upper frame 81C. The hollow portion 81f includes therein the bearing 83 disposed between the bottom lid 81b and the brake drum 82e to allow the lower frame 82C to be rotatable.

The brake 9C includes a pair of linings 94aC and 94bC, a pair of shoes 93aC and 93bC, hydraulic cylinders 99a and 99b, and a pair of springs 98a and 98b. The linings 94aC and 94bC are rotatably pivotally supported on the upper lid 81c by the shaft S4. Further, the shoes 93aC and 93bC are fixed to the linings 94aC and 94bC respectively. The hydraulic cylinders 99a and 99b are used for press-contacting the shoes 93aC and 93bC against the rotating body. The springs 98a and 98b are for keeping the shoes 93aC and 93bC away from the rotating body and maintaining the brake 9C in a released state.

As described above, the grapple 8C of the third embodiment includes a non-retrofitted brake 9C (rotation braking means). Further, the grapple 8C of the third embodiment allows the lower frame 82C to be rotatable, but does not include means for driving the rotation of the hydraulic motor or the like. For this reason, the grapple 8C has the same effect as in the first embodiment and is extremely less expensive without the rotation drive means.

Note that, for example, when timber is loaded on a truck using the grapple 8C without a driving source for rotation, the timber can be rotated by an operation technique of moving the grapple 8C while keeping the gripped timber in contact with the fall prevention rod or the like of the truck. Note also that timber can be rotated by human power. Then, when the timber rotating and gripped by the rotatable grapple 8C reaches a desired position, the rotation of the timber can be stopped by placing the grapple 8C in an unrotatable state by the brake 9C, thereby to maintain the position of the timber. For this reason, even if the rotatable grapple 8C without rotation drive means is used, the timber can be loaded without any problem as long as the grapple 8C includes rotation braking means.

Fourth Embodiment

Then, a grapple 8D of a fourth embodiment will be described with reference to FIG. 5. It should be noted that in the grapple 8D of the fourth embodiment, the same reference characters or numerals are assigned to the components having the same configuration as those of the grapple 8C of the third embodiment, but a suffix "D" is added to the reference characters or numerals of the components having the same name but a different configuration. One of the major differences between the grapple 8D of the fourth embodiment and the grapple 8C of the third embodiment is that the claws 82aC of the third embodiment is rotated by the hydraulic cylinder 82f, but the claws 82aD of the fourth embodiment is rotated by wires.

Figure 5:
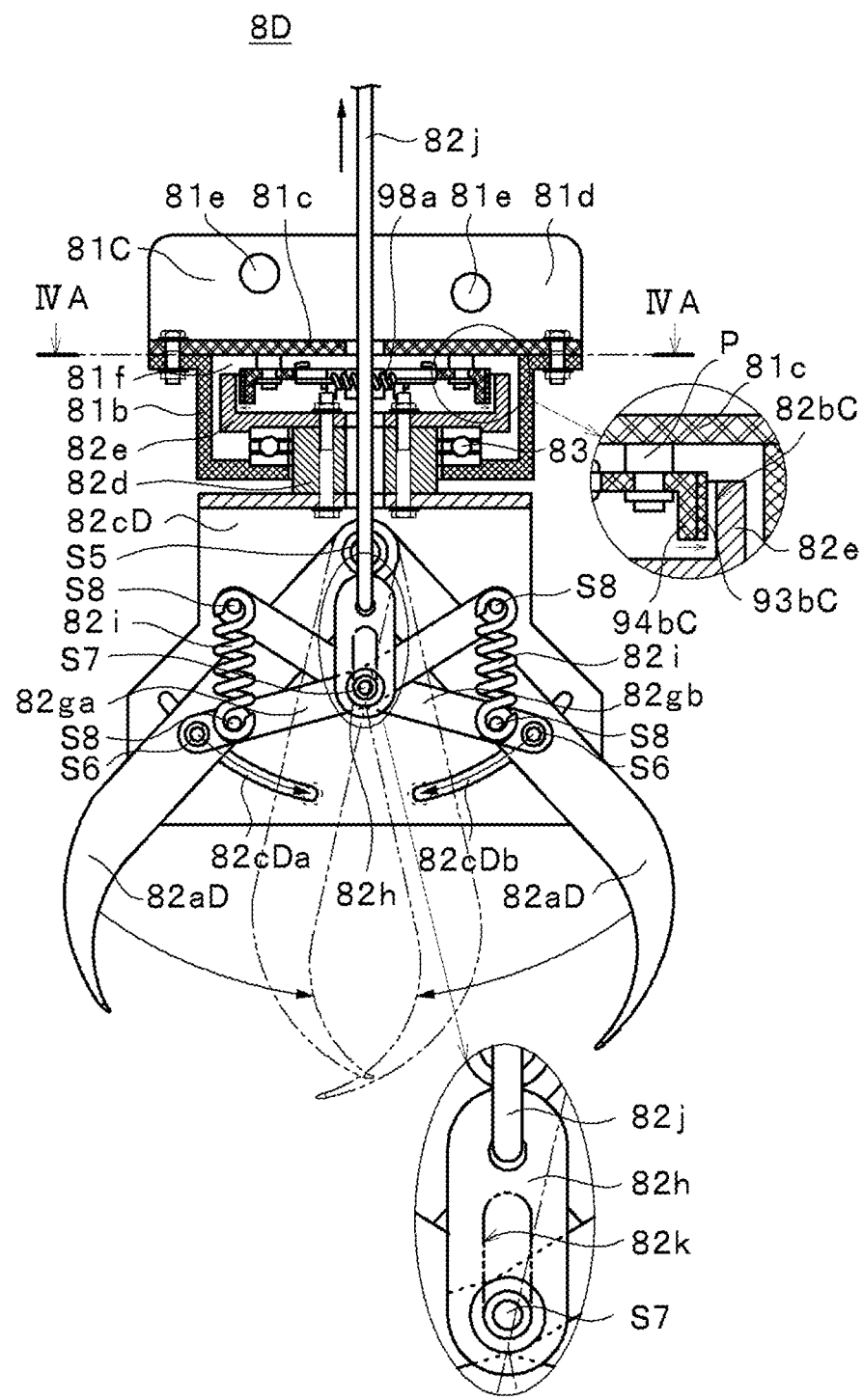
FIG. 5 is a sectional view illustrating a configuration of a grapple of a fourth embodiment.

As illustrated in FIG. 5, a pair of claws 82aD with different lengths are rotatably pivotally supported on a claw mounting bracket 82cD by a shaft S5. One end of a pair of links 82ga and 82gb is rotatably pivotally supported on the pair of claws 82aD by a shaft S6. A substantially center portion of the links 82ga and 82gb is rotatably pivotally supported on one end of a connection plate 82h by a shaft S7. The other end of the links 82ga and 82gb is coupled with a vicinity of one end of the other links 82ga and 82gb via a shaft S8 by a total of two springs 82i. A total of four shafts S8 are crimped to the pair of links 82ga and 82gb by caulking. The springs 82i are engaged with grooves (unillustrated) formed in the shafts S8, and the one end and the other end of the links 82ga and 82gb are urged in a direction of getting closer to each other by the tensile force of the springs 82i. One end of a wire 82j is fixed to the other end of a connection plate 82h. The wire 82j penetrates the center of the grapple 8D and extends outside the grapple 8D. The other end of the wire 82j is fixed to a position pulled by an operation portion of the driver's seat.

According to such a configuration, at standby time, the one end of the links 82ga and 82gb is rotated to be opened by the springs 82i, and accordingly the distal end of the claws 82aD is rotated to be opened, thereby entering a standby state.

Further, the shaft S7 is located closer to the shaft S5 than the two shafts S6. Thus, when the wire 82j is pulled, one end of the links 82ga and 82gb is rotated in a closing direction. Accordingly, the distal end of the claws 82aD is rotated to grip the timber W and closed. Note that to prevent the claws 82aD from floating when the wire 82j is pulled, a pair of arc-shaped guide holes 82cDa and 82cDb to be engaged with the shafts S6 are disposed on the claw mounting bracket 82cD. Note also that to prevent the connection plate 82h from rotating about the shaft S5 when the wire 82j is pulled in a shifted direction, an oval-shaped guide hole through which the shaft S7 of the connection plate 82h is fitted is disposed on an unillustrated guide plate.

The grapple 8D of the fourth embodiment can perform opening and closing drive of the claws 82aD using a wire device without the need for a new hydraulic device for the grapple as the opening and closing drive of the claws 82aD, and thus can provide a lesser expensive grapple 8D than the grapple 8C of the third embodiment.

As described above, the grapple 8 is configured to include the lower frame 82 having the claws 82a for gripping the timber, and the upper frame 81 rotatably holding the lower frame 82, and to further include the brake 9 as the rotation braking means for braking the rotation of the lower frame 82. This configuration can provide a less expensive and safe grapple 8 allowing even a less skilled operator to easily stop the rotation of the grapple 8 by forcibly braking the rotation of the lower frame 82 constituting the grapple 8 by means of an external force and capable of preventing accidents due to the rotation.

Meanwhile, if braking is applied from outside while the lower frame is driven to rotate by the motor like in the first embodiment and the second embodiment, a large load may be applied to each of the motor drive means and the rotation braking means. In such a case, there is a risk of damaging at least one of the means. There is also a possibility of increasing the time to stop the rotation of the lower frame.

For this reason, the inventor considered that when the rotation of the lower frame is braked from outside, the rotation drive of the grapple is stopped to prevent a large load from being applied to the motor drive means for rotation and the rotation braking means. The use of such a configuration can provide a work vehicle including a grapple capable of preventing damage of at least one of the motor drive means and the rotation braking means, and capable of quickly stopping the rotation of the lower frame. Therefore, the following description will focus on such a work vehicle.

Fifth Embodiment

The configuration of a work vehicle C including a grapple C8 of the present embodiment will be described with reference to FIGS. 6 to 9. The work vehicle C is a vehicle which adds rotation braking means H1 and motor drive stopping means H2 to a common work vehicle which grips timber W or the like and moves the gripped timber W to a truck, a timber storage site, or the like. It should be noted that the present embodiment will describe the work vehicle C including the grapple C8 using the grapple C8 gripping the timber as the example, but the work vehicle C is not limited to be used for forestry. The work vehicle C can be used at any places, such as construction sites and demolition sites.

The work vehicle C includes a traveling body C1 traveling on a rubber crawler C11, a rotating body C2 having a driver's seat C21 and rotatably pivotally supported on the traveling body C1, a boom C4 pivotally supported on the rotating body C2 and bendable by a hydraulic boom cylinder C3, an arm C6 pivotally supported on the boom C4 and bendable by a hydraulic arm cylinder C5, and a grapple C8 pivotally supported on the arm C6 and bendable by a hydraulic grapple cylinder C7.

The grapple C8 includes a lower frame C82 having claws C83 gripping timber or the like, an upper frame C81 rotatably pivotally supporting the lower frame C82, and motor drive means H3 for rotating the lower frame C82, and further includes rotation braking means H1 for braking the rotation of the lower frame C82 and motor drive stopping means H2 for stopping driving the motor drive means H3 by causing the rotation braking means H1 to apply braking to the rotation. Note that the lower frame C82 is pivotally supported on the upper frame C81 and is driven to rotate by a hydraulic motor 31.

Figure 6:
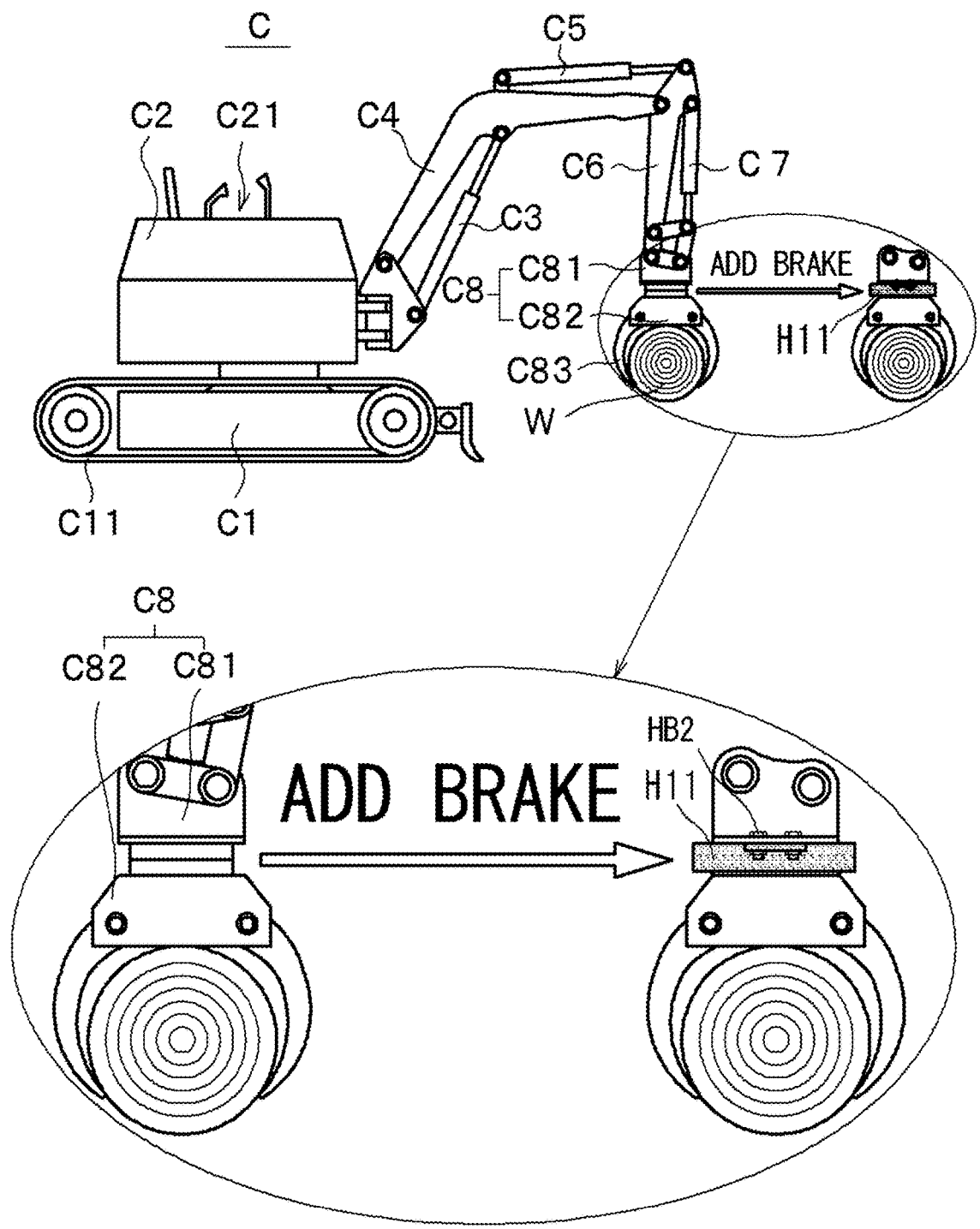
FIG. 6 is a front view illustrating a mounting position of a brake of a fifth embodiment.
Figure 7A:
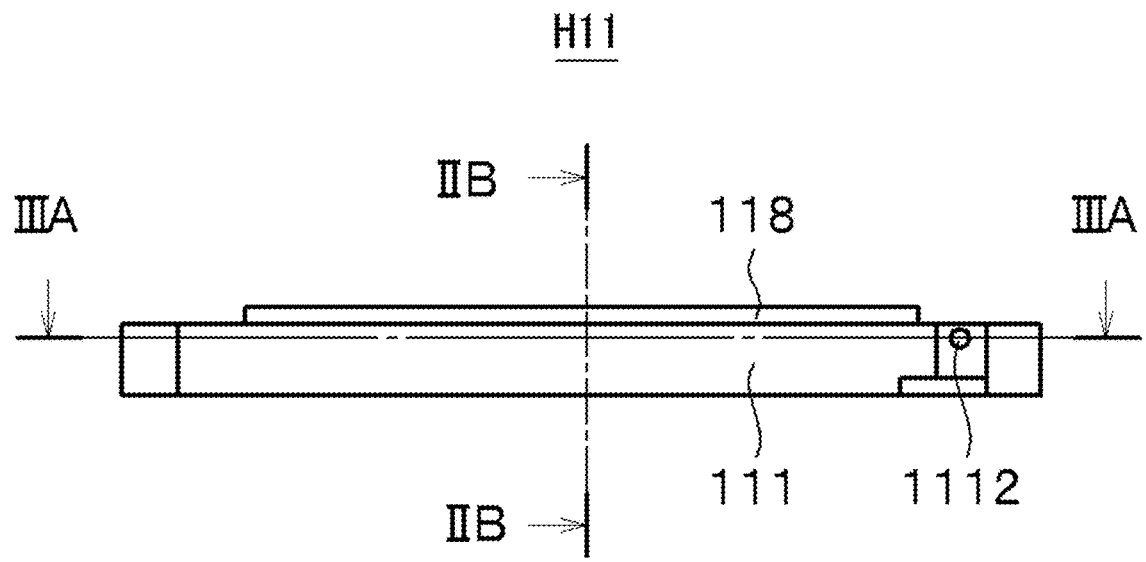
FIG. 7A is a right side view of the brake of the fifth embodiment.
Figure 7B:
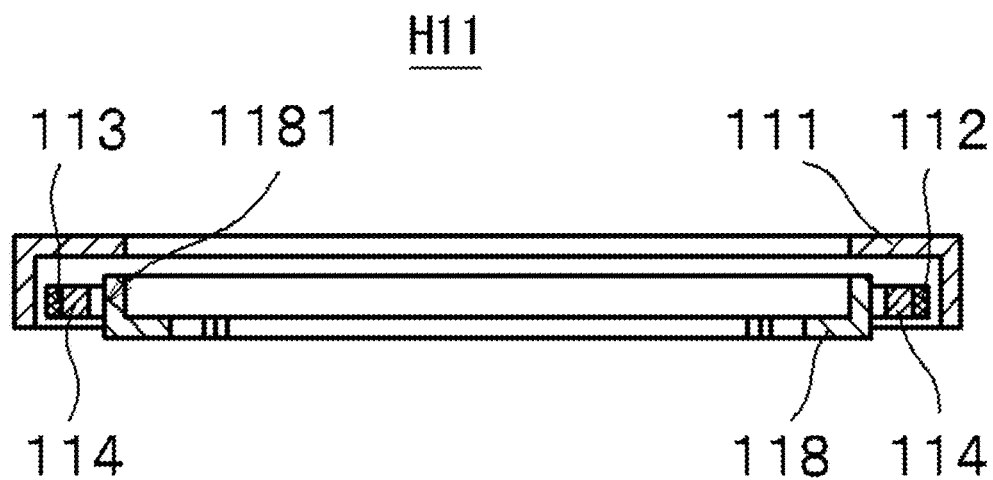
FIG. 7B is a sectional front view along line IIB-IIB of FIG. 7A.

The rotation braking means H1 includes a brake H11 and a pedal H12. As illustrated in FIG. 6, the brake H11 serving as a specific example of the rotation braking means H1 is retrofitted to an existing grapple C8. The brake H11 includes a support body 111, first and second linings 112 and 113 rotatably pivotally supported on the support body 111, two shoes 114 fixed to the first and second linings 112 and 113, a helical compression spring 115, a washer 116, a brake wire 117, and a rotating body 118. Note that the first lining 112 has a mounting bracket 1121 and two screws HB1 as accessories for fixing the brake wire 117.

Figure 8A:
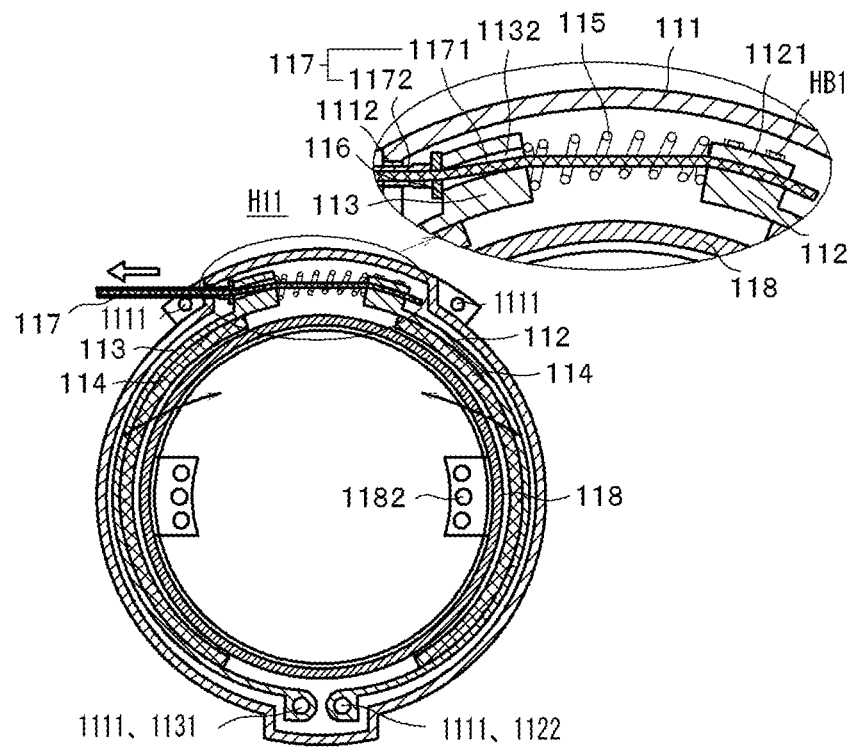
FIG. 8A is a sectional plan view along line IIIA-IIIA of FIG. 7A before braking is applied.

The support body 111 has a total of four mounting holes 1111, the two holes of which are located one end of the support body 111 (on an upper side in FIG. 8A) and the remaining two holes of which are located the other end thereof (on a lower side in FIG. 8A). The support body 111 is fixed to the upper frame C81 of the grapple C8 by the screws HB2 through the holes 1111. The shaft holes 1122 and 1131 of the first and second linings 112 and 113 are fitted to the screws HB2 inserted into the lower two holes 1111 so that the first and second linings 112 and 113 are rotatable together with the shoes 114.

As illustrated in FIG. 8A, the brake wire 117 is covered with an outer wire 1172 so that an inner wire 1171 is slidable, and has the same structure as the brake wire of a bicycle. One end of the inner wire 1171 is inserted into a through-hole 1112 disposed in the support body 111, and the washer 116 is inserted thereinto. Further, the one of the inner wire 1171 is inserted into a through-hole 1132 disposed in an end of the second lining 113, and the helical compression spring 115 is inserted thereinto. Furthermore, the one end of the inner wire 1171 is screwed to an end opposite to the shaft hole 1122 of the first lining 112 by the mounting bracket 1121 and the two screws HB1. With such a configuration, when the inner wire 1171 is pulled, the two shoes 114 of the first and second linings 112 and 113 are rotated in a direction of getting closer to the shaft holes 1122 and 1131.

The rotating body 118 has a brake surface 1181 having a cylindrical surface in contact with the two shoes 114 at braking time of the rotation braking means H1, and screwed to the lower frame C82 of the grapple C8 by screws (unillustrated) through six mounting holes 1182.

Figure 8B:
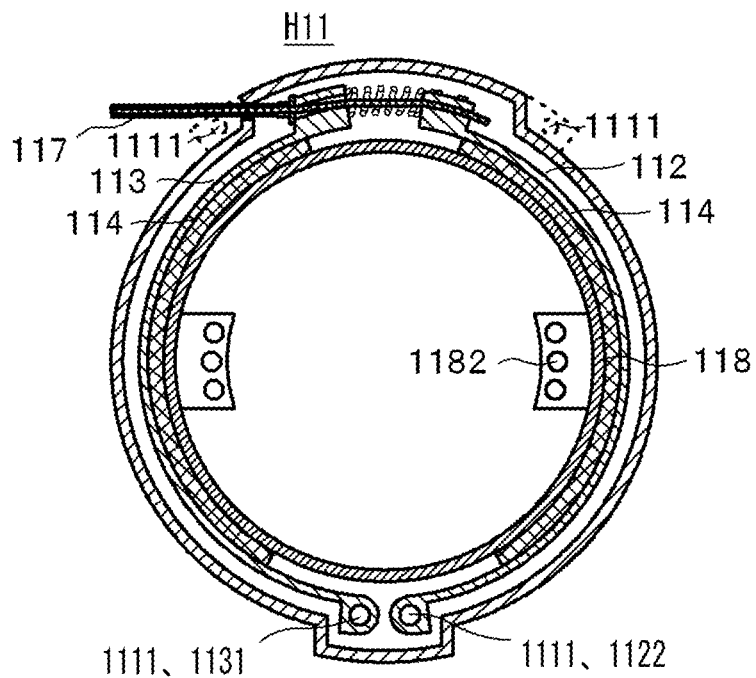
FIG. 8B is a sectional plan view in a state where the braking in FIG. 8A is applied.

As illustrated in FIG. 8A, in a state in which the inner wire 1171 is not pulled, the two shoes 114 are spaced apart from the brake surface 1181 of the rotating body 118 and enters a state in which the rotation of the lower frame C82 is released (brake releasing state). As illustrated in FIG. 8B, in a state in which the inner wire 1171 is pulled, the two shoes 114 press the brake surface 1181 of the rotating body 118. Since the two shoes 114 are fixed to the upper frame C81 and the rotating body 118 is fixed to the lower frame C82, the pulling of the inner wire 1171 brakes the rotation of the lower frame C82.

Figure 9:
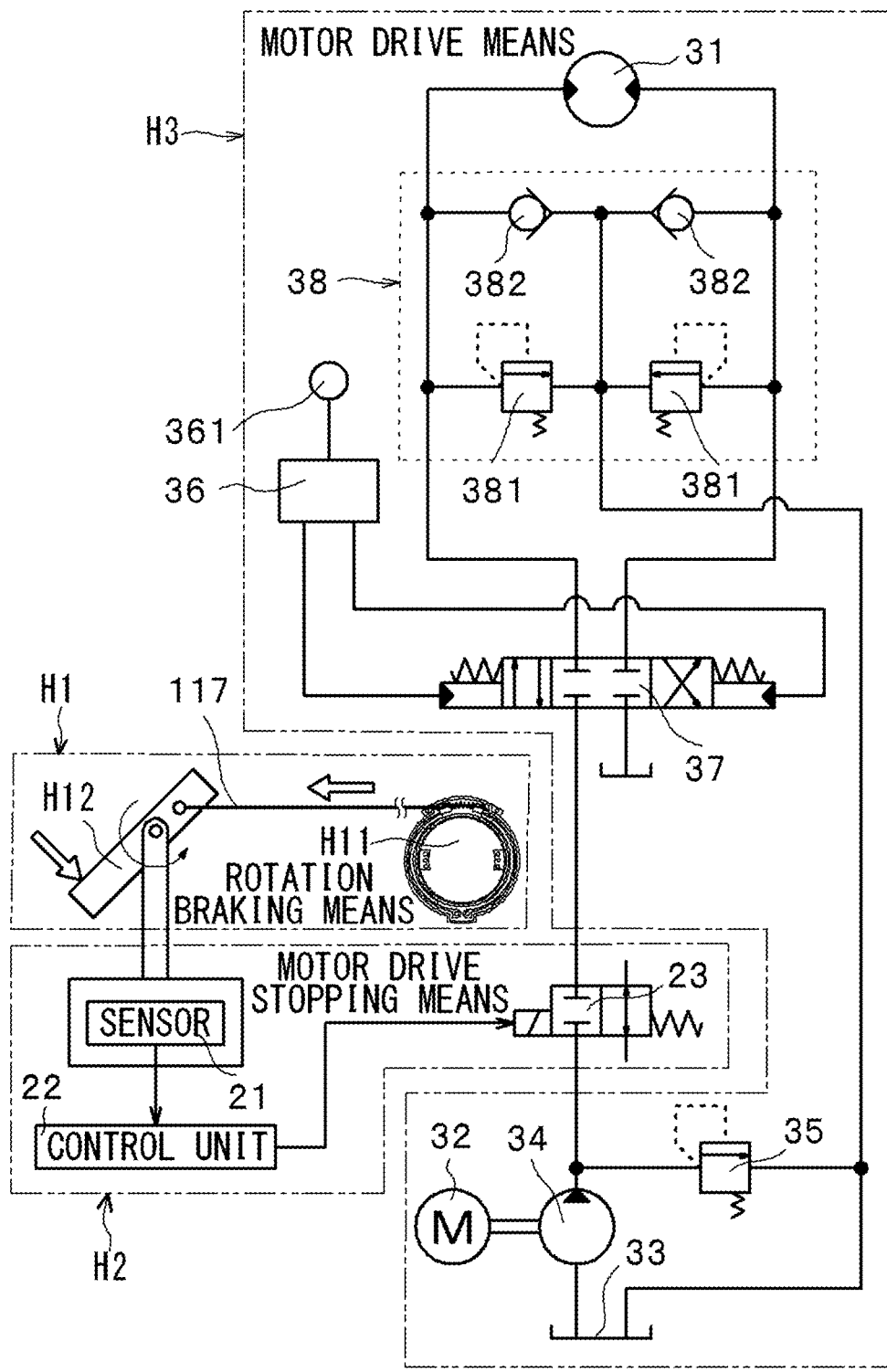
FIG. 9 is a block/hydraulic circuit diagram illustrating a main portion of motor drive means and motor drive stopping means of the fifth embodiment.

As illustrated in FIG. 9, the brake wire 117 is connected to the pedal H12 disposed in the driver's seat C21. When the pedal H12 is pressed by a foot of the user, the inner wire 1171 is pulled to brake the rotation of the lower frame C82.

Then, the configuration of the main components related to the rotation of the grapple C8 will be described. The rotation operation of the grapple C8 is performed by the motor drive means H3 for driving the rotation of the grapple C8, the rotation braking means H1 for braking the rotation of the grapple C8 by human power, and the motor drive stopping means H2 for stopping the driving of the motor drive means H3.

The motor drive means H3 includes a motor 31, an electric motor 32, a tank 33, a pump 34, a relief valve 35, an operation valve 36, a hydraulic selector valve 37, and a brake circuit 38. The motor 31 performs two types of rotation (right rotation and left rotation as viewed from the driver's seat C21) to rotate the lower frame C82 of the grapple C8 by hydraulic pressure.

The relief valve 35 is a main safety valve which draws oil for rotating the motor 31 from the tank 33 by the electric motor 32 at a high pressure, and when the oil pressure is equal to or greater than a predetermined value, releases the oil to the tank 33 to cause the oil pressure to be equal to or less than the predetermined value. The operation valve 36 has a lever 361. In response to either one of the left and right rotation instructions, the lever 361 is operated to output the oil at the instructed pressure. The hydraulic selector valve 37 is a control valve which switches among the following modes: a mode of sending high-pressure oil from the pump 34 to the right rotation circuit, a mode of sending the oil to the left rotation circuit, and a neutral mode of sending the oil to neither circuit, based on the hydraulic pressure instructed from the operation valve 36.

The brake circuit 38 prevents an excessive hydraulic pressure from being applied to the motor 31 and also performs a decelerating action. The brake circuit 38 includes a pair of left and right relief valves 381 which release oil to the tank 33 when the hydraulic pressure is equal to or greater than a predetermined value, and a pair of left and right check valves (one-way valves) 382 which allow the oil to flow in only one direction. Further, the brake circuit 38 decelerates the motor 31 when the hydraulic selector valve 37 is switched from the rotation position to the neutral position. With such a configuration, the motor drive means H3 rotates the lower frame C82 in the right direction or in the left direction by hydraulic pressure based on the lever operation by the user. As described above, the rotation braking means H1 brakes the rotation of the lower frame C82 by friction in response to the operation of the pedal H12 by the user.

The motor drive stopping means H2 includes a sensor 21, a control unit 22, and a solenoid valve 23. The sensor 21 is for detecting that the pedal H12 is operated. The control unit 22 outputs a stop signal based on an output of the sensor 21. When a stop signal is received from the control unit 22 in the normal open position, the solenoid valve 23 interrupts sending oil from the pump 34 of the motor drive means H3 to the hydraulic selector valve 37 to stop the rotation driving of the motor 31.

Note that the sensor 21 is a photosensor for detecting interruption of light and detects ON/OFF as to whether or not the pedal H12 is rotated a predetermined distance or more. With such a configuration, when the rotation braking means H1 brakes the rotation of the lower frame C82, the motor drive stopping means H2 stops the rotation driving of the pump 34. After the rotation stops, the user returns the lever 361 of the operation valve 36 to the neutral position and then releases pressing of the pedal H12.

Meanwhile, the method of detecting ON/OFF of the pedal H12 of the present invention is not limited to the sensor 21. For example, a reed switch operated by a magnet, a magnetoresistive element operated by a magnetic field, an electric switch closing a contact by pressing, or the like may be used detect the ON/OFF of the pedal H12. Further, the detection of the braking operation of the rotation braking means H1 is not limited to the detection of the operation of the pedal H12. For example, the operation of the inner wire 1171 may be detected. Furthermore, the method of stopping the rotation driving of the motor 31 is not limited to the solenoid valve 23. For example, a hydraulic signal instructed from the operation valve 36 may be interrupted, or the lever 361 of the operation valve 36 may be directly returned to the neutral position.

Figure 10:
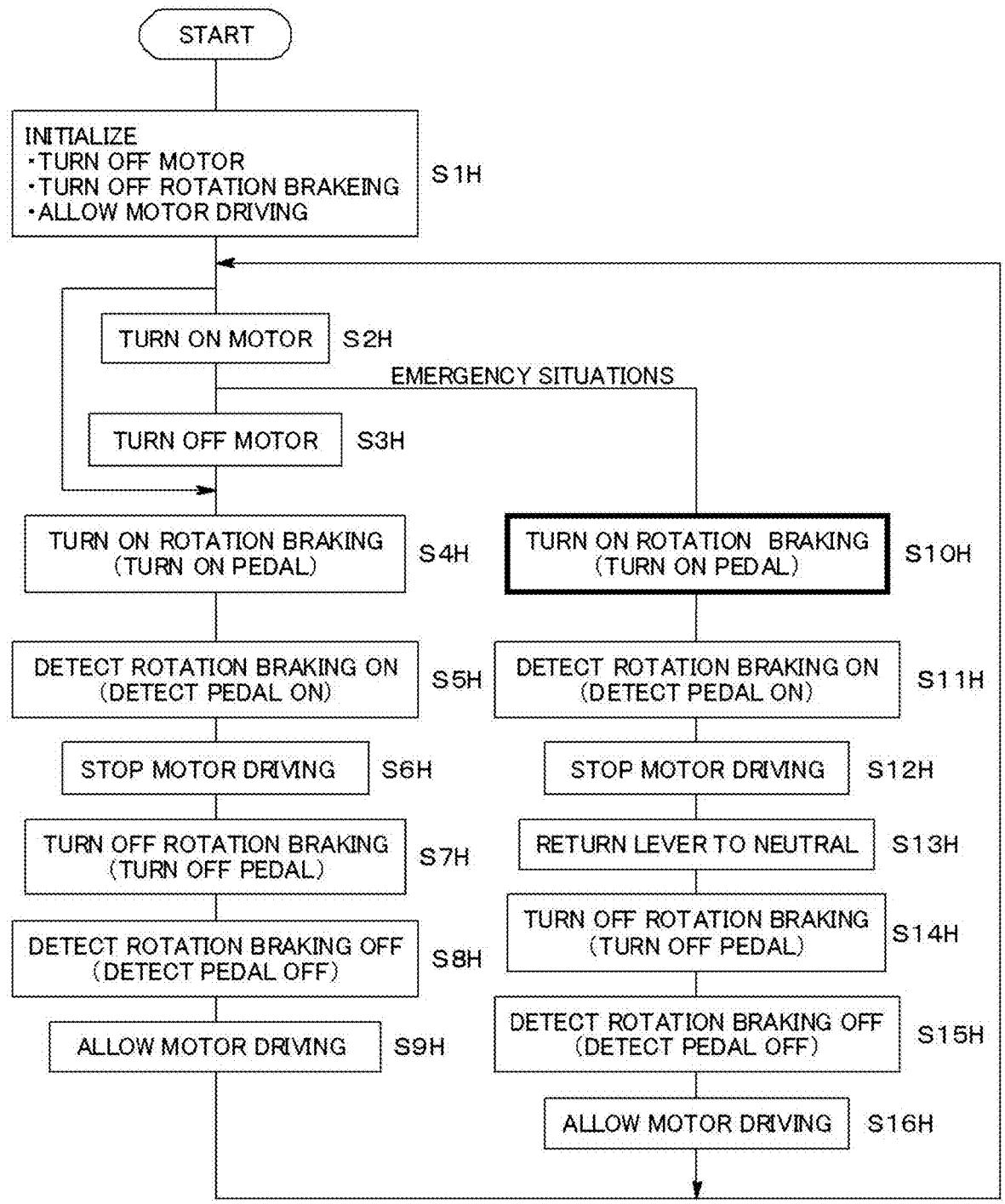
FIG. 10 is a flowchart illustrating a main portion of a rotation operation of the fifth embodiment.

Then, the rotation operation will be described with reference to FIG. 10. In the initial state where the lever 361 is in the neutral position and the lower frame C82 stops, the motor 31 of the motor drive means H3 stops, the rotation braking means H1 stops braking the rotation, and the motor drive stopping means H2 allows driving of the motor 31 (step S1H).

The motor 31 is rotated by the operation of the user (step S2H). Then, the lever 361 is returned to the neutral position and the pump 34 stops sending oil to the motor 31 (step S3H). At this time, although the motor drive means H3 has the brake circuit 38, the lower frame C82 gripping the timber has an inertial force of rotation. Further, it takes time for the lower frame C82 to stop due to oil leakage from the motor 31 or the hydraulic selector valve 37.

When the pedal H12 of the rotation braking means H1 disposed for this purpose is pressed by the operation of the user (operation of pressing the pedal H12), the rotation of the lower frame C82 is braked (step S4H). The motor drive stopping means H2 detects the braking operation by the pedal H12 (step S5H), and interrupts sending oil to the pump 34 so as to stop driving of the motor 31 (step S6H).

Meanwhile, in the steps S2H to S6H, the step S3H has already stopped sending oil to the pump 34. Thus, the action of the motor drive stopping means H2 herein is not particularly effective. The action of the motor drive stopping means H2 is effective in a situation to be described later.

When the user stops pressing the pedal H12 (operation of releasing the foot from the pedal 12), the braking of the rotation braking means H1 is released (step S7H). The motor drive stopping means H2 detects this (step S8H). The motor drive stopping means H2 releases the interruption of the oil by the solenoid valve 23 (step S9H).

Here, although the motor 31 is driven to rotate in step S2H, the user may press the pedal H12 of the rotation braking means H1 for some reasons (emergency situations, operational errors, or the like) (step S10H). At this time, in the same manner as in steps S5H and S6H, the motor drive stopping means H2 detects the braking operation of the pedal H12 (step S11H), interrupts sending oil to the motor 31, and stops driving the motor 31 (step S12H). For this reason, a large load is prevented from being applied to the motor drive means H3 and the rotation braking means H1 at the same time.

In the state in which the pedal H12 is being pressed, the user returns the lever 361 to the neutral position (step S13H). Then, in the same manner as in steps S7H, S8H, and S9H, the braking of the rotation braking means H1 is released (step S14H), the motor drive stopping means H2 detects this (step S15H), and the motor drive stopping means H2 releases the interruption of the oil by the solenoid valve 23 (step S16H).

As described above, the work vehicle C of the present embodiment includes the rotation braking means H1 which forcibly stops, by an external force, the grapple C8 which cannot immediately stop the rotation by moment of inertia or the like. Both the braking of the rotation braking means H1 and the driving of the motor 31 for rotation may be applied to the grapple C8 at the same time.

In such a case, when the braking of the rotation braking means H1 is applied, the motor drive stopping means H2 of the present embodiment acts to stop driving of the motor 31. This can prevent a large load from being applied to the motor drive means H3 and the rotation braking means H1, and thus can prevent damage of at least one of the motor drive means H3 and the rotation braking means H1. Further, the motor drive stopping means H2 detects the pressing of the pedal H12, and thus the motor drive stopping means H2 of the present embodiment can be disposed at low cost.

As described above, although the motor 31 is driven to rotate, the pedal H12 of the rotation braking means H1 may be pressed for some reasons such as emergency situations and operational errors (step S10H), and the motor drive stopping means H2 acts accordingly. The reasons for such a situation are not limited to emergency situations and operation errors. For example, in the operation of a common grapple C8, the work vehicle C can perform finer and more delicate work operation by positively utilizing the effect of the motor drive stopping means H2. Further, the rotation braking means H1 using an external force has an advantage that the grapple C8 can be stopped more quickly than the motor drive means H3 (of the brake circuit 38) by stopping sending oil. Therefore, it is conceivable that the user frequently uses this advantage to operate the grapple C8.

In the present embodiment, the work vehicle C has been described using an example in which the brake H11 and the pedal H12 are connected by the brake wire 117 as an example of the specific configuration of the rotation braking means H1, but the brake H11 and the pedal H12 are not always required to be connected by the brake wire 117. For example, the work vehicle C may be configured such that the brake H11 and the pedal H12 are electrically connected to each other so that the movement of the pedal H12 is transmitted to the brake H11 by an electric signal to actuate the brake H11.

In addition, the brake H11 has been described such that braking is applied by pulling the brake wire 117, but, for example, the brake H11 may be configured such that a hydraulic cylinder is used to apply braking by moving the piston of the hydraulic cylinder.

Further, the rotation braking means H1 has been described using the pedal H12 which is operated by foot pressing, but the pedal H12 is not limited to the foot operation. For example, the rotation braking means H1 may be a manual type which is operated by hand using a brake lever like a parking brake. Furthermore, the rotation braking means H1 may be a button type configured to perform the braking operation.

Furthermore, the rotation braking means H1 is not limited to the configuration of braking by pressing the brake surface 1181 like the brake 11, but may be configured to brake by pushing in or out a lock pin or the like, or may be a disk brake.

Sixth Embodiment

Figure 11A:
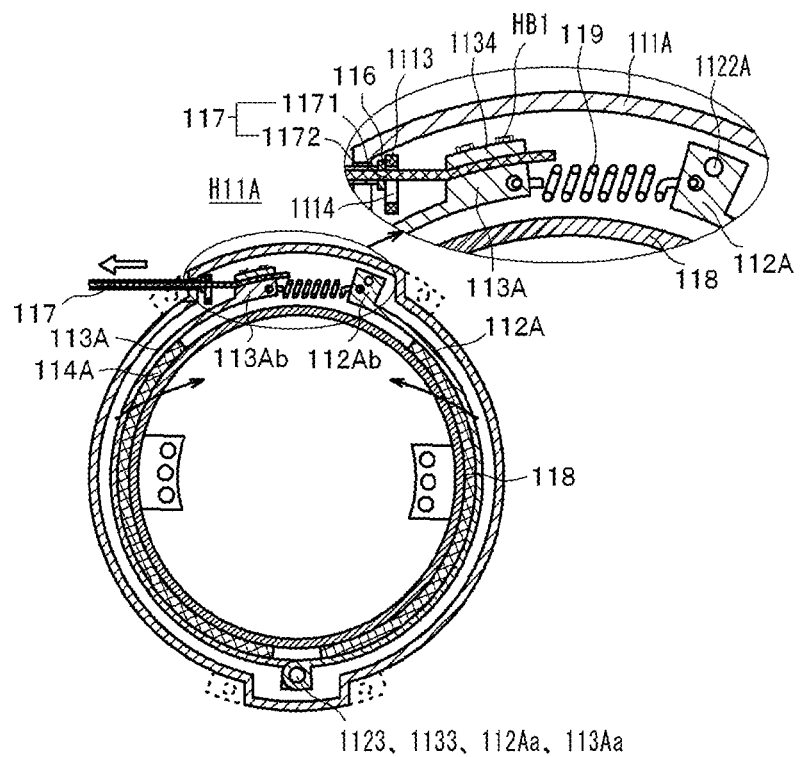
FIG. 11A is a sectional plan view illustrating a main portion of a brake of a sixth embodiment corresponding to FIG. 7A of the fifth embodiment.
Figure 11B:
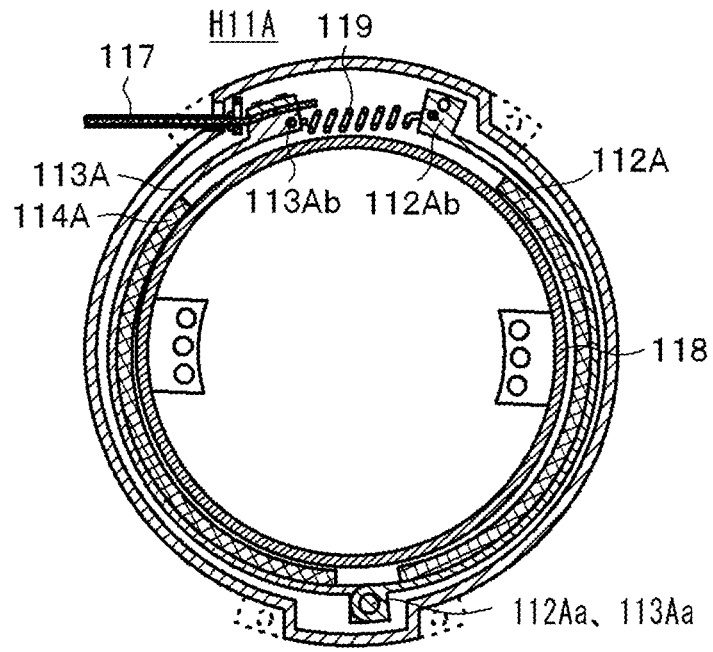
FIG. 11B is a sectional plan view in a state where the braking in FIG. 11A is released.

Then, a work vehicle (unillustrated) of the second embodiment will be described. One of the major differences between the work vehicle of the second embodiment and the work vehicle C of the first embodiment is the brake. FIG. 11A illustrates a state in which the rotation of the grapple of the second embodiment is braked, and FIG. 11B illustrates a state in which the braking of the rotation is released.

The brake H11A is configured such that the braking is applied to the rotation of the lower frame S82 in the state in which the inner wire 1171 is not pulled, and the braking is released when the inner wire 1171 is pulled. In other words, the second embodiment is configured such that when the pedal H12 is pressed, the braking of the rotation is released, and when the pressing of the pedal H12 is released, the braking of the rotation is applied.

The brake H11A is configured such that one ends 112Aa and 113Aa of the first and second linings 112A and 113A are coupled with the coupling holes 1123 and 1133, and the other ends 112Ab and 113Ab of the first and second linings 112A and 113A are pulled to each other by a tension coil spring 119.

As illustrated in FIG. 11A, the tension coil spring 119 causes the shoe 114A to press the rotating body 118 to brake the rotation of the lower frame S82.

The other end 112Ab of the first lining 112A is rotatably pivotally supported on a support body 111A by a shaft hole 1122A. The other end 113Ab of a second lining 113A is coupled with the inner wire 1171 by the mounting bracket 1134 and the first screw B1. The washer 116 through which the inner wire 1171 is passed and an elongated hole 1114 of the rib 1113 standingly disposed on the support body 111A serve as a stopper of the outer wire 1172.

When the inner wire 1171 is pulled, the other end 113Ab of the second lining 113A is pulled, the one end 113Aa thereof is also pulled, and the one end 112Aa of the first lining 112A is also pulled. At this time, since the support body 111A of the other end 112Ab of the first lining 112A is pivotally supported, the first lining 112A and the second lining 113A are rotated. Thus, the first lining 112A and the second lining 113A are rotated about the coupling holes 1123 and 1133 to be opened. Then, as illustrated in FIG. 11B, the two shoes 114A are separated from each other to allow the lower frame S82 to be rotated.

The motor drive stopping means (unillustrated) of the present embodiment performs an operation opposite to the motor drive stopping means H2 of the fifth embodiment, such as releasing the braking of the rotation when the pedal H12 is pressed and applying braking to the rotation when the pressing of the pedal H12 is released.

Figure 12:
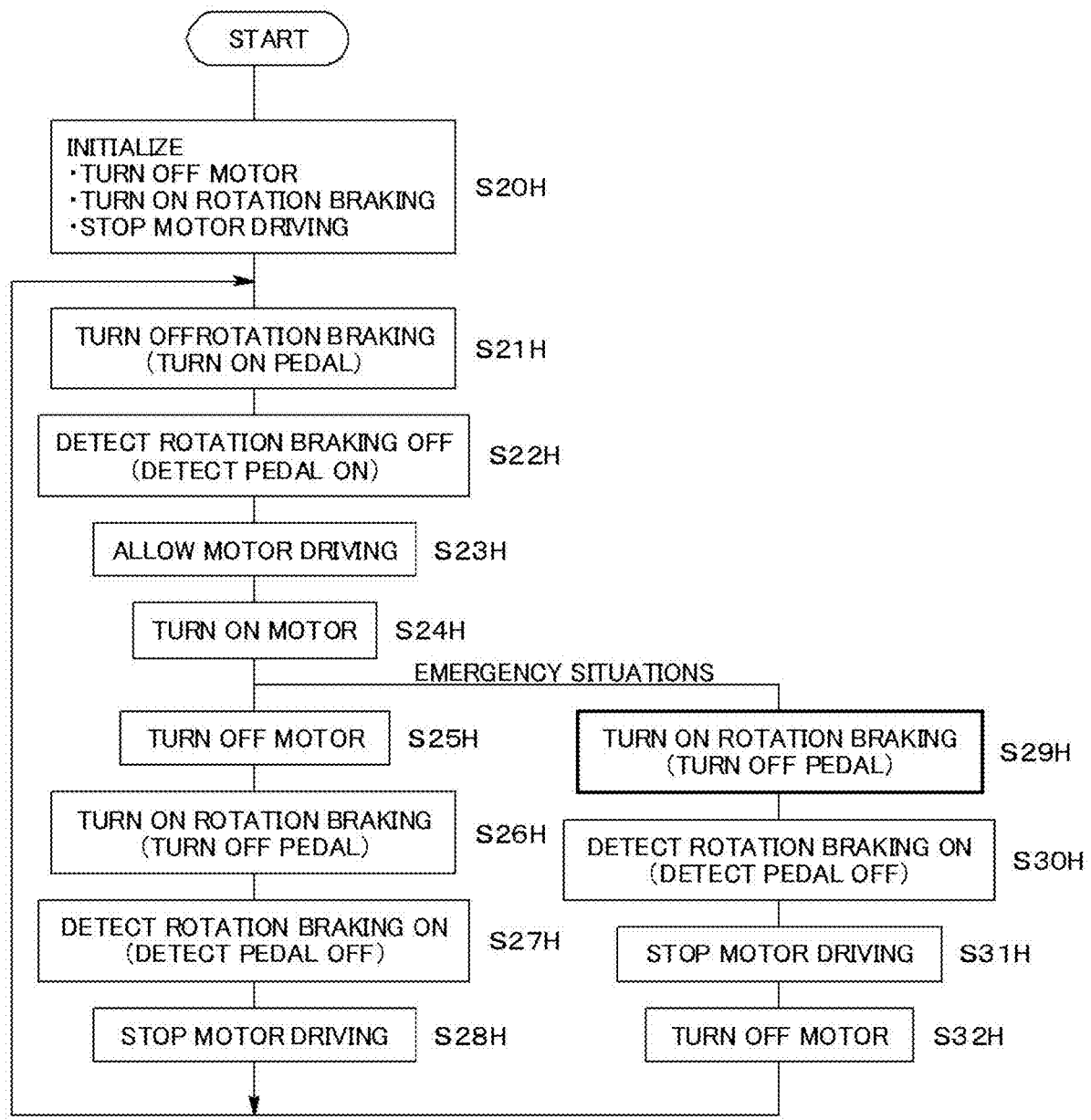
FIG. 12 is a flowchart illustrating a main portion of a rotation operation of a sixth embodiment.

Then, the operation of the rotation will be described with reference to FIG. 12. In the initial state where the lever 361 is in the neutral position and the lower frame C82 stops, the motor 31 of the motor drive means H3 stops, the rotation braking means (brake H11A) applies braking to the rotation, and the motor drive stopping means stops driving the motor 31 (step S20H).

The brake H11A is different from the brake H11 of the fifth embodiment in that braking of the rotation is applied in the initial state. Therefore, in order to release the braking, the pedal H12 is pressed to release the braking of the rotation (step S21H).

The motor drive stopping means detects the braking release operation by the pedal H12 (step S22H) and allows oil to be sent to the motor 31 (step S23H).

The motor 31 is rotated by the lever 361 operated by the user (step S24H). Then, the lever 361 is returned to the neutral position and the pump 34 stops sending oil to the motor 31 (step S25H). Then, the pressing of the pedal H12 of the rotation braking means is released by the operation of the user to brake the rotation of the lower frame C82 (step S26H). The motor drive stopping means detects the braking operation by the pedal H12 (step S27H) and interrupts sending oil to the pump 34 so as to stop driving the motor 31 (step S28H).

However, in this case, the step S25H has already stopped sending oil to the motor 31. Thus, the action of the motor drive stopping means herein is not particularly effective. The action of the motor drive stopping means is effective in the following situations.

Here, it is assumed that in step S24H during which the motor 31 is rotated and the lower frame C82 is rotated, an emergency situation occurs in which the rotation of the lower frame C82 must be stopped as soon as possible. At this time, the pressing of the pedal of the rotation braking means is released by the operation of the user and the rotation of the lower frame C82 is braked earlier than when the lever 361 is returned to the neutral position and the pump 34 stops sending oil to the motor 31 (step S29H).

When such a situation occurs, the motor drive stopping means detects the braking operation by the pedal (step S30H) and interrupts sending oil to the pump 34 so as to stop driving the motor 31 (step S31H). This can prevent a large load from being applied to the motor drive means and the rotation braking means and thus can prevent damage of at least one of the motor drive means and the rotation braking means. Then, the lever 361 is returned to the neutral position and the pump 34 stops sending oil to the motor 31 (step S33H).

Note that the brake H11A is designed to drive rotation when the pedal is not pressed and the brake wire 117A is not pulled. Thus, for example, when the timber W is gripped by the claws C83, the grapple C8 does not rotate by the weight moment of the timber W even if the grapple C8 is moved by rotation of the rotating body C2 or by bending and stretching of the boom C4 and the arm C6. Note also that even when the work vehicle C is transported, the braking of the rotation is usually applied. Thus, the grapple C8 does not rotate spontaneously due to vibration or the like during the transportation.

Seventh Embodiment

Figure 13:
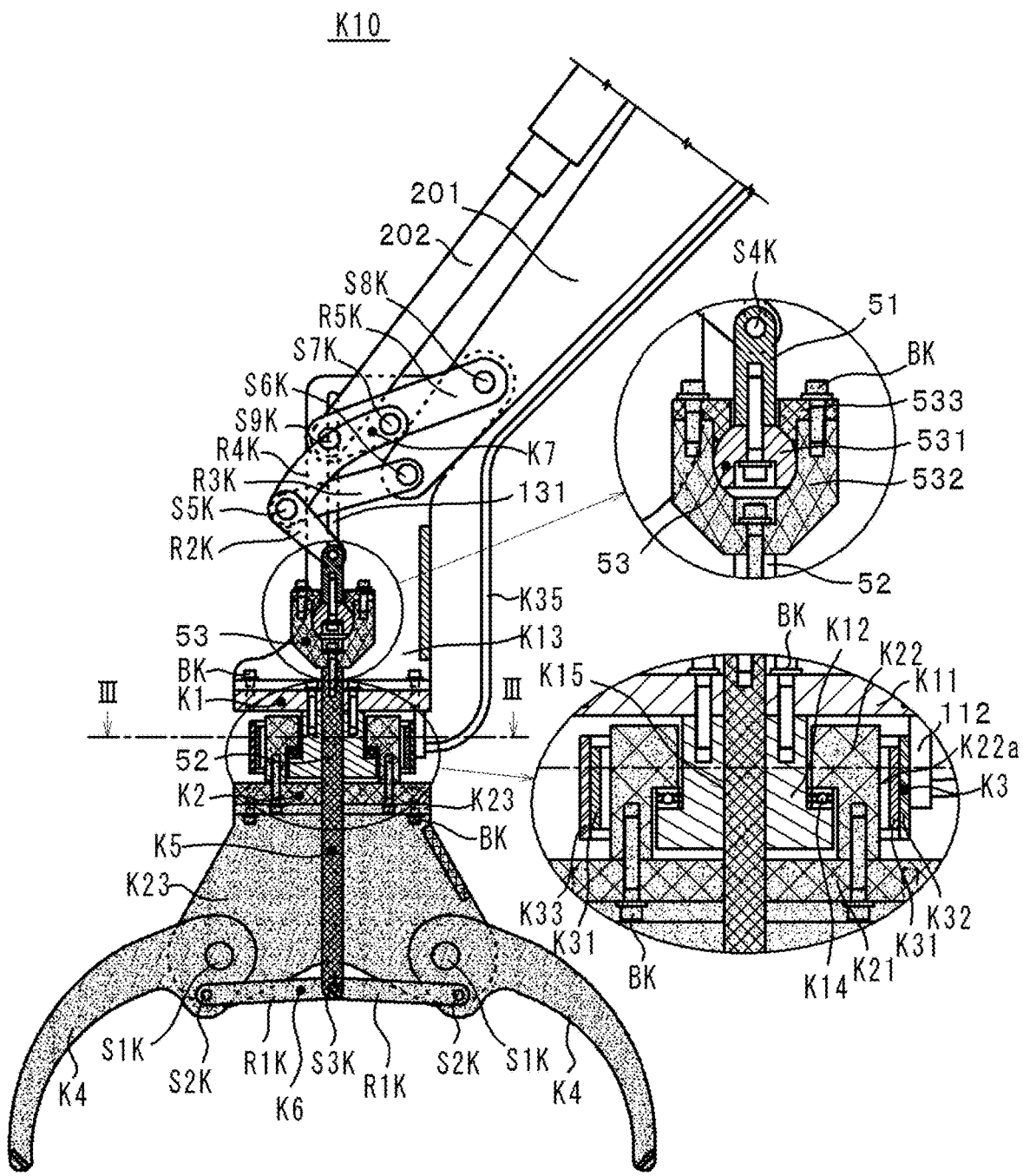
FIG. 13 is a partially sectional front view in a state where the claws of a grapple according to a seventh embodiment are opened.
Figure 14:
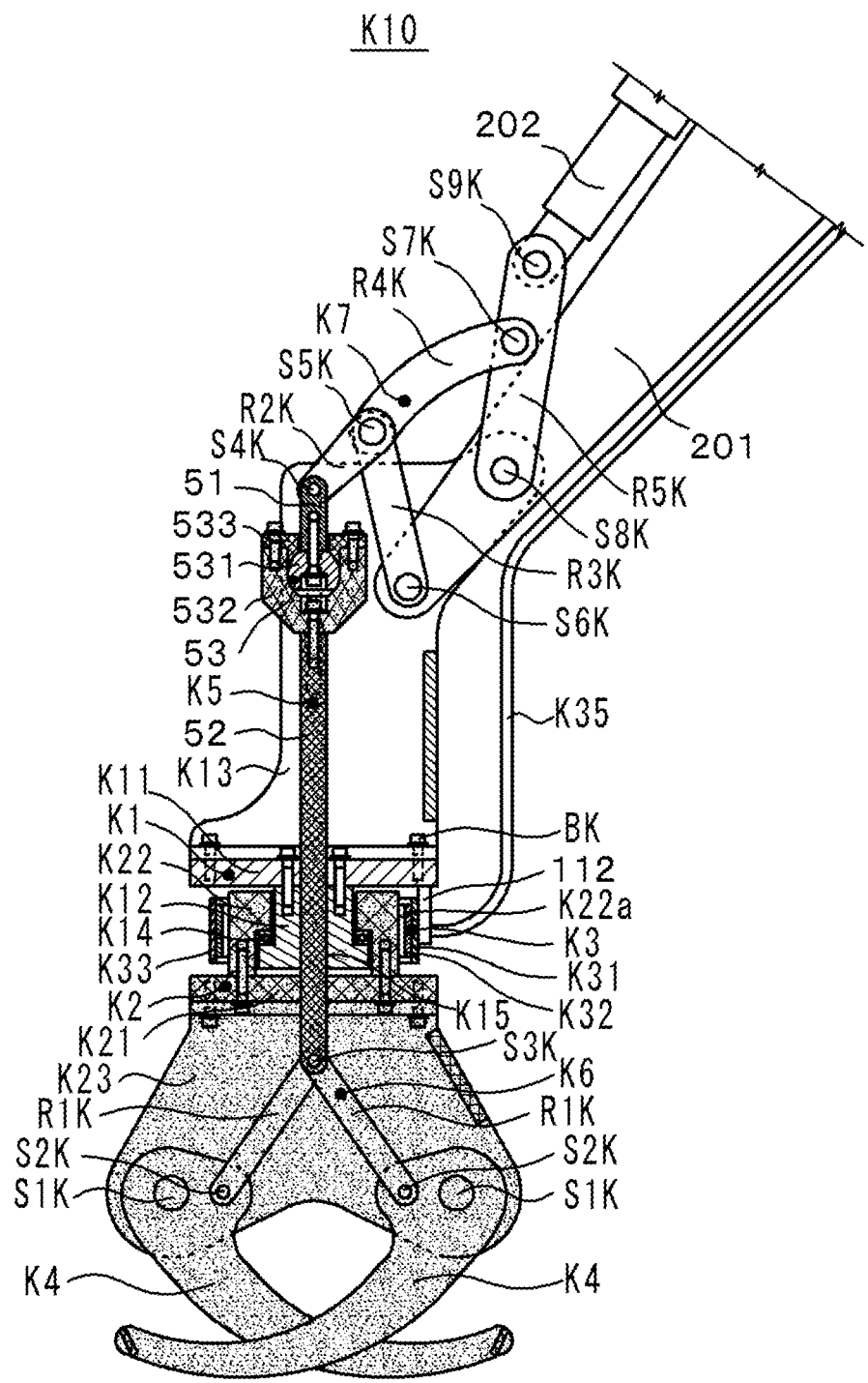
FIG. 14 is a partially sectional front view in a state where the claws of the grapple of FIG. 13 are closed.
Figure 15:
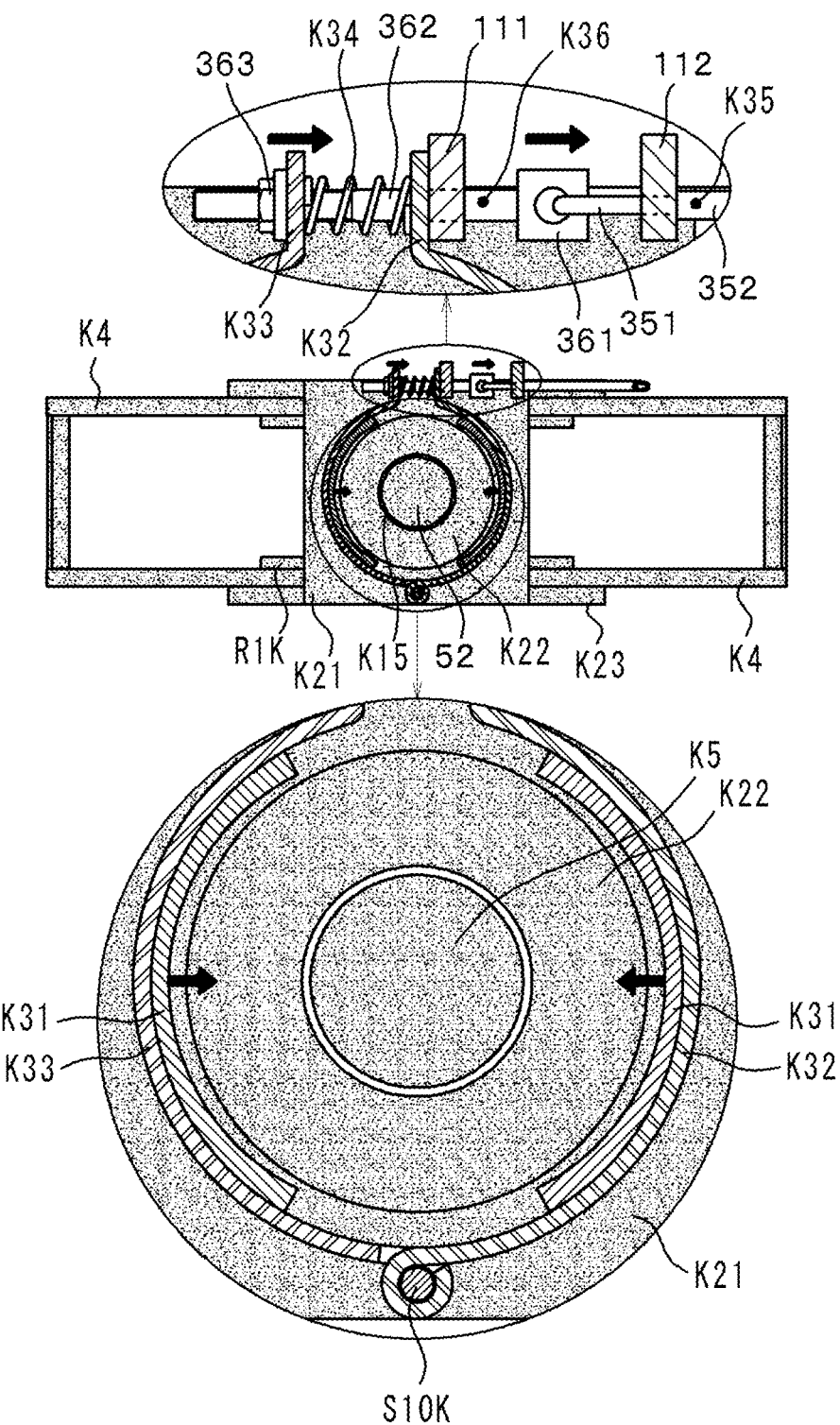
FIG. 15 is a sectional view illustrating a configuration of the brake of the grapple of the seventh embodiment.

The grapple of the present embodiment will be described with reference to FIGS. 13 to 15. The grapple of the present embodiment is a grapple which opens and closes claws using an existing packet cylinder (corresponding to the grapple cylinder of the above described embodiments) of the work vehicle. FIG. 13 is a partially sectional front view in a state where the claws are opened. FIG. 14 a partially sectional front view in a state where the claws are closed. FIG. 15 is a sectional view illustrating the configuration of the brake. Note that the configuration of the main components is illustrated by a cross section. The cross sections of the rotating members are cross-hatched, the cross sections of the non-rotating members are single-hatched, and further the rotating members are shaded.

The grapple K10 includes an upper frame K1, a lower frame K2, a brake K3, a pair of left and right claws K4, a shaft portion K5, a first link mechanism K6, and a second link mechanism K7. The upper frame K1 is held by an arm 201 of the work vehicle. The lower frame K2 is rotatably pivotally supported on the upper frame K1. The brake K3 is for braking the rotation of the lower frame K2. The claws K4 are pivotally supported on the rotating lower frame K2 by the first shafts S1K in a freely openable and closable manner. The shaft portion K5 is vertically slidably held. The first link mechanism K6 is for coupling the shaft portion K5 and the claws K4. The second link mechanism K7 is for coupling the shaft portion K5 and an existing packet cylinder 202 of the work vehicle.

Note that the packet cylinder 202 applies a sliding force to the shaft portion K5 in the axial direction of the shaft portion K5 via the second link mechanism K7. The packet cylinder 202 may be hydraulic or pneumatic.

The upper frame K1 includes a metal top plate K11, a support bracket K12 having an L-shaped rotating shape, a body mounting bracket K13, and a bearing K14. The lower frame K2 includes a metal bottom plate K21, an engaging bracket K22 having an inverted L-shaped rotating shape, and a claw mounting bracket K23.

As illustrated in an enlarged view of FIG. 13, in the state in which the L shape of the support bracket K12 is engaged with the inverted L-shape of the engaging bracket K22 so as to mesh with each other with the bearing K14 sandwiched therebetween, the top plate K11 is screwed to the support bracket K12 by a screw BK having a spring washer and the bottom plate K21 is screwed to the engaging bracket K22 by the screw BK. This causes the bottom plate K21 to be rotatable relative to the top plate K11. The body mounting bracket K13 is screwed to the top plate K11 by the screw BK. The claw mounting bracket K23 having a pair of freely openable and closable claws K4 is screwed to the bottom plate K21 by the screw BK.

The shaft portion K5 includes a fixing shaft 51 located on the side of the packet cylinder 202, a rotating shaft 52 located on the side of the claws K4, and a rotating portion 53 rotatably coupling the rotating shaft 52 with the fixing shaft 51.

The rotating portion 53 includes a coupling ball 531, a ball case 532, and a lid 533. A hollow portion housing the coupling ball 531 is formed by the ball case 532 and the lid 533. The coupling ball 531 is fixed to the fixing shaft 51. The ball case 532 is fixed to the rotating shaft 52. In the state in which the coupling ball 531 is housed in the ball case 532, the lid 533 is screwed to the ball case 532 by the screw BK. This causes the rotating shaft 52 to be rotatably coupled with the fixing shaft 51.

The rotating shaft 52 penetrates the upper frame K1 and the lower frame K2 coaxially with the rotational axis of the lower frame K2.

The first link mechanism K6 is a mechanism for opening and closing the claws K4 by sliding of the shaft portion K5. The first link mechanism K6 includes a pair of left and right first links R1K. Each of the one ends of the first links R1K is rotatably pivotally supported by the second shaft S2K. Each of the other ends thereof is rotatably pivotally supported on the distal end of the rotating shaft 52 by the third shaft S3K.

The second link mechanism K7 is a mechanism for sliding the shaft 52 by an expansion and contraction motion of the packet cylinder 202. The second link mechanism K7 includes a second link R2K, a third link R3K, a fourth link R4K, and a fifth link R5K.

One end of the second link R2K is rotatably pivotally supported on the distal end of the fixing shaft 51 by the fourth shaft S4K. The fourth shaft S4K is inserted into an elongated guide hole 131 disposed in the body mounting bracket K13. The shaft portion K5 is slidably held by the elongated guide hole 131 and a through-hole K15 allowing the rotating shaft 52 to penetrate the upper frame K1 and the lower frame K2. The other end of the second link R2K is rotatably pivotally supported by the fifth shaft S5K, together with one end of the third link R3K and one end of the fourth link R4K.

The other end of the third link R3K is rotatably pivotally supported by a sixth shaft S6K, together with the distal end of the arm 201 and the body mounting bracket K13. The other end of the fourth link R4K is rotatably pivotally supported near the center of the fifth link R5K by a seventh shaft S7K.

One end of the fifth link R5K is rotatably pivotally supported near the distal end of the arm 201 by an eighth shaft S8K. The other end of the fifth link R5K is rotatably pivotally supported on the distal end of the packet cylinder 202 by a ninth shaft S9K. The sixth shaft S6K is a shaft serving as a fulcrum for bending the conventional grapple. The fifth link R5K is a conventional link for coupling the packet cylinder 202 with the arm 201.

When the packet cylinder 202 shrinks from the state in which the claw 4K is opened by such a link mechanism, the fifth link R5K rotates right about the eighth shaft S8K. Then, the seventh shaft S7K rotates right about the eighth shaft S8K and the fifth shaft S5K moves upward. Thus, the shaft portion K5 slides upward, the third shaft S3K of the distal end of the shaft portion K5 moves upward, the second shaft S2K moves toward the center, and the claws K4 is closed. FIG. 14 is a view in the state where the claws K4 are closed.

As described above, the lower frame K2 rotatably pivotally supported relative to the upper frame K1. The claws K4 pivotally supported on the lower frame K2 in a freely openable and closable manner is opened and closed via the first link mechanism K6 by sliding of the shaft portion K5. The shaft portion K5 is disposed coaxially with the rotation of the lower frame K2 (rotation of the claws K4) and penetrates the upper frame K1 and the lower frame K2, and includes the rotating portion 53 which causes the first link mechanism K6 and the packet cylinder 202 to be rotatable.

Therefore, although the shaft portion K5 and the packet cylinder 202 connected by the second link mechanism K7 are fixed to the arm 201, the rotating portion 53 allows the claws K4 to be rotated. As described above, although the claws K4 are rotated, the packet cylinder 202 for opening and closing the claws K4 is not rotated. Thus, the grapple K10 can provide a less expensive and simplified grapple without the need for a swivel joint for supplying oil to the packet cylinder 202.

In addition, according to the configuration disclosed in Patent Literature 1, the cylinder for opening and closing the claws is disposed on the lower frame and is rotated together with the claws. Thus, this configuration needs a swivel joint for the cylinder and is expensive and complicated. In contrast to this, the grapple K10 can be less expensive and simplified in structure to fit the configuration disclosed in Patent Literature 1. The grapple K10 opens and closes the claws K4 using the existing packet cylinder 202 for bending the grapple K10 and thus can provide a less expensive grapple without the need for a new cylinder for opening and closing. Note that the angle in the bending direction of the grapple K10 cannot be changed by the packet cylinder 202, but can be changed by bending of a boom (unillustrated) or the arm 201.

Then, the brake K3 will be described. FIG. 15 is a sectional view along line III-III of FIG. 13. The claws K4 of the grapple K10 of the present invention not only can be opened and closed by sliding of the shaft portion K5 but also can be rotated without power such as a hydraulic motor.

Here, the reason that the claws K4 can be rotated without power for rotation will be described. The shaft portion K5 of the grapple K10 includes the rotating portion 53. Therefore, the first link mechanism K6 is configured to be freely rotatable relative to the packet cylinder 202 and thus the claws K4 is also rotatable relative to the packet cylinder 202.

For this reason, for example, generally, a fall prevention rod is vertically mounted on a truck for loading timber to prevent the timber from falling. When the timber is loaded on the truck, the work vehicle is rotated while the timber gripped by the grapple K10 is in contact with the fall prevention rod or the like. Then, the claws K4 are rotated relative to the packet cylinder 202, and thus the direction of the timber relative to the work vehicle can be freely changed. The grapple K10 is configured to freely rotate the claws K4 in this manner, thus allowing the direction of the timber to be freely changed using an operation technique. Further, since the claws K4 can be freely rotated, the direction of the timber can also be changed by human power.

The brake K3 is used such that when the timber rotating in a state of being gripped by a freely rotatable grapple K100 reaches a desired position, the brake K3 stops the rotation of the timber at the desired position and maintains the position of the timber. It should be noted that the grapple K100 of the present embodiment is effective not only for the configuration in which the brake K3 is used to rotate the claws K4 without using power such as a hydraulic motor, but also for a configuration in which the brake K3 is used to rotate the claws K4 using power such as a hydraulic motor.

The brake K3 includes a pair of left and right shoes K31, a pair of left and right first linings K32, a second lining K33, a tenth shaft S10K, a helical compression spring K34, a brake wire K35, a first rib 111, a second rib 112, and a joint K36.

The shoes K31 are disposed near a side surface K22a of the engaging bracket K22 of the rotatable lower frame K2. Regarding the first and second linings K32 and K33, the tenth shaft S10K to which each of the shoes K31 is fixed pivotally supports the one end of the first and second linings K32 and K33 in an openable and closable manner like a hinge. The helical compression spring K34 is for urging the first and second linings K32 and K33 in an opening direction. The brake wire K35 is for pulling the first and second linings K32 and K33 in a closing direction. The first rib 111 is for preventing movement of the first lining K32. The second rib 112 is for preventing movement of one end of the outer wire 352 via one end of the inner wire 351 of the brake wire K35. Note that the first rib 111 and the second rib 112 are ribs extending from the top plate K11 and are not rotated.

The joint K36 is for connecting one end of the inner wire 351 of the brake wire K35 to the second lining K33. The joint K36 includes a bolt 362 having a connection portion on a head portion 361, and a nut 363. The head portion 361 of the bolt 362 is connected to the inner wire 351. The bolt 362 is disposed such that the first rib 111 and the other end of the first lining K32 are penetrated therethrough, the helical compression spring K34 is inserted thereinto, and the other end of the second lining K33 is penetrated therethrough. The joint K36 prevents the second lining K33 from coming off by screwing the nut 363 into the bolt 362.

In addition, the nut 363 can adjust the brake force. Although not illustrated, the brake K3 is configured such that the other end of the brake wire K35 is connected to a foot pedal of the work vehicle, the other end of the outer wire 352 is fixed, and the other end of the inner wire 351 is pulled by pressing the foot pedal.

FIGS. 13 and 15 illustrate the state in which the claws K4 can be rotated, and the shoes K31 are separated from the side surface K22a of the engaging bracket K22 by urging of the helical compression spring K34. When the foot pedal is pressed to pull the inner wire 351, the second lining K33 moves close to the first lining K32 to be closed, and the shoes K31 presses the side surface K22a of the engaging bracket K22 to brake the rotation of the claws K4. Such a simple configuration allows the grapple K10 of the present embodiment to provide a less expensive brake K3.

As described above, the grapple K10 of the present embodiment is mounted on an arm of the work vehicle and comprises: the rotating claws K4; the first link mechanism K6 connected to the claws K4; the shaft portion K5 connected to the first link mechanism K6, being coaxial with the rotational axis of the claws K4, and sliding in the axial direction to open and close the claws K4; and the packet cylinder 202 applying a sliding force to the shaft portion K5 in the axial direction thereof via the second link mechanism K7, wherein the shaft portion K5 comprises the rotating portion 53 causing the first link mechanism K6 to be rotatable relative to the packet cylinder 202.

Note that the connection to the claws K4 of the first link mechanism K6 includes not only the connection of the present embodiment but, for example, also includes a connection adding another link mechanism. Note also that the connection between the shaft portion K5 and the packet cylinder 202 via the second link mechanism K7 includes not only the connection via the second link mechanism K7, but also includes a connection adding another link mechanism.

Eighth Embodiment

Figure 17:
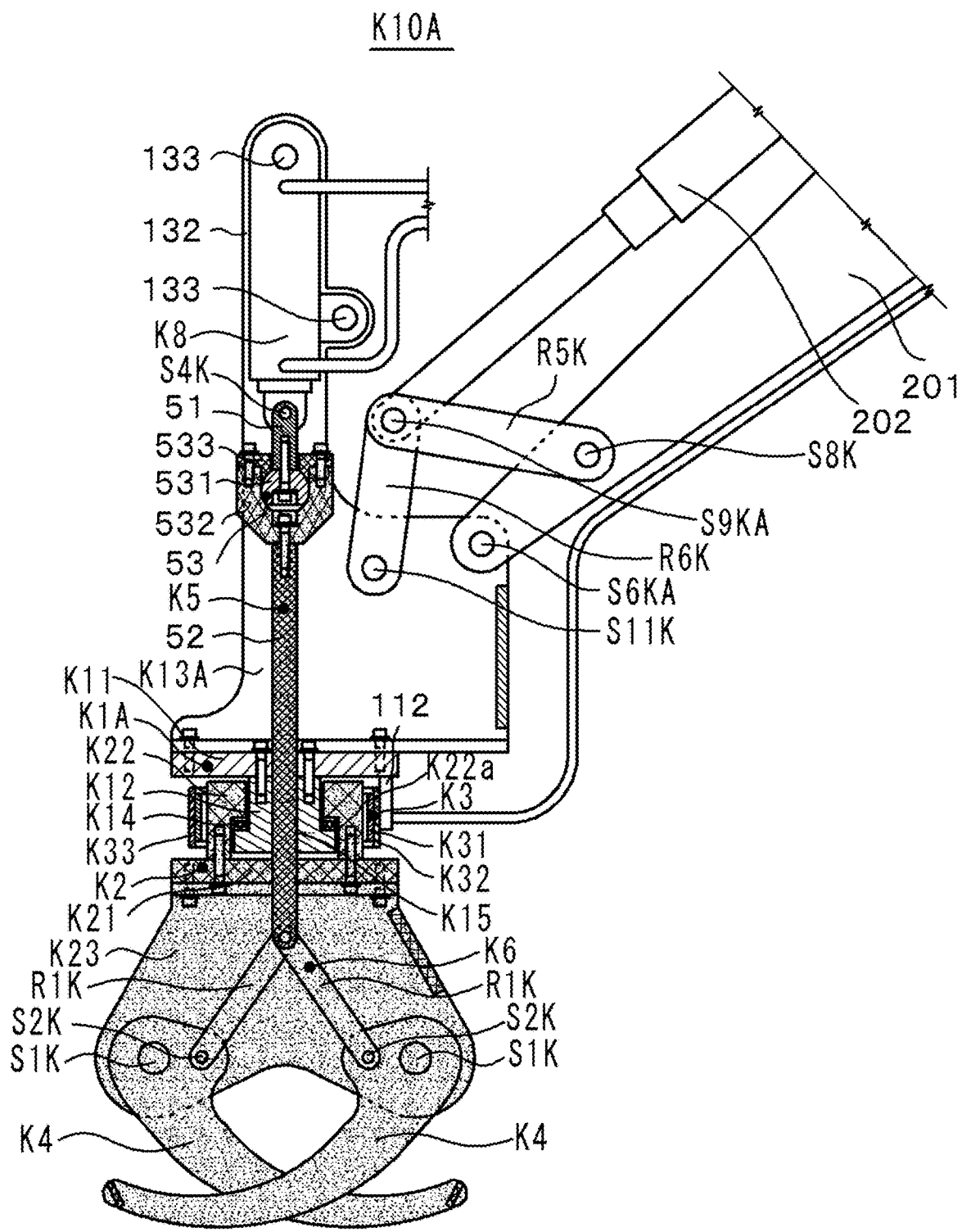
FIG. 17 is a partially sectional front view in a state where the claws of FIG. 16 are closed.
Figure 18:
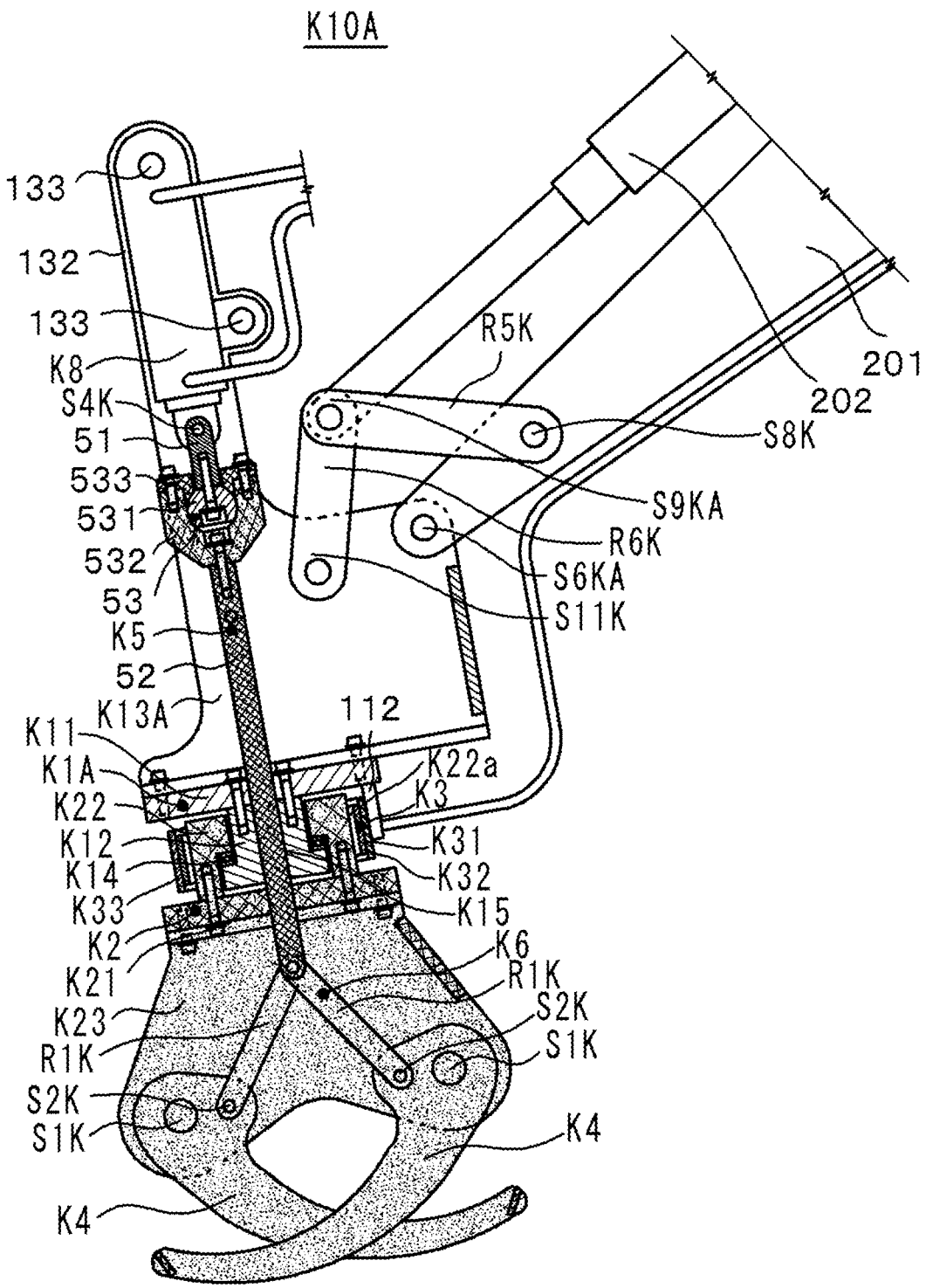
FIG. 18 is a partial sectional view illustrating a state where the grapple of FIG. 16 swings.

Then, a grapple 100A of the present embodiment will be described with reference to FIGS. 16 to 18. The grapple K10A is different from the grapple K10 of the seventh embodiment in that a dedicated claw cylinder K8 for opening and closing the claws K4 is added to be directly connected to the shaft portion K5.

It should be noted that in the grapple K10A, the same reference characters or numerals are assigned to the components having the same configuration as those of the grapple K10 of the seventh embodiment, but a suffix "A" is added to the reference characters or numerals of the components similar to those of the grapple K10 and only the differences will be described.

The lower frame K2, the brake K3, the claws K4, the shaft portion K5, and the first link mechanism of the grapple K10A are the same as those of the seventh embodiment. The eighth embodiment is different from the seventh embodiment only in that an upper frame K1A includes a body mounting bracket K13A and there is no second link mechanism.

Figure 16:
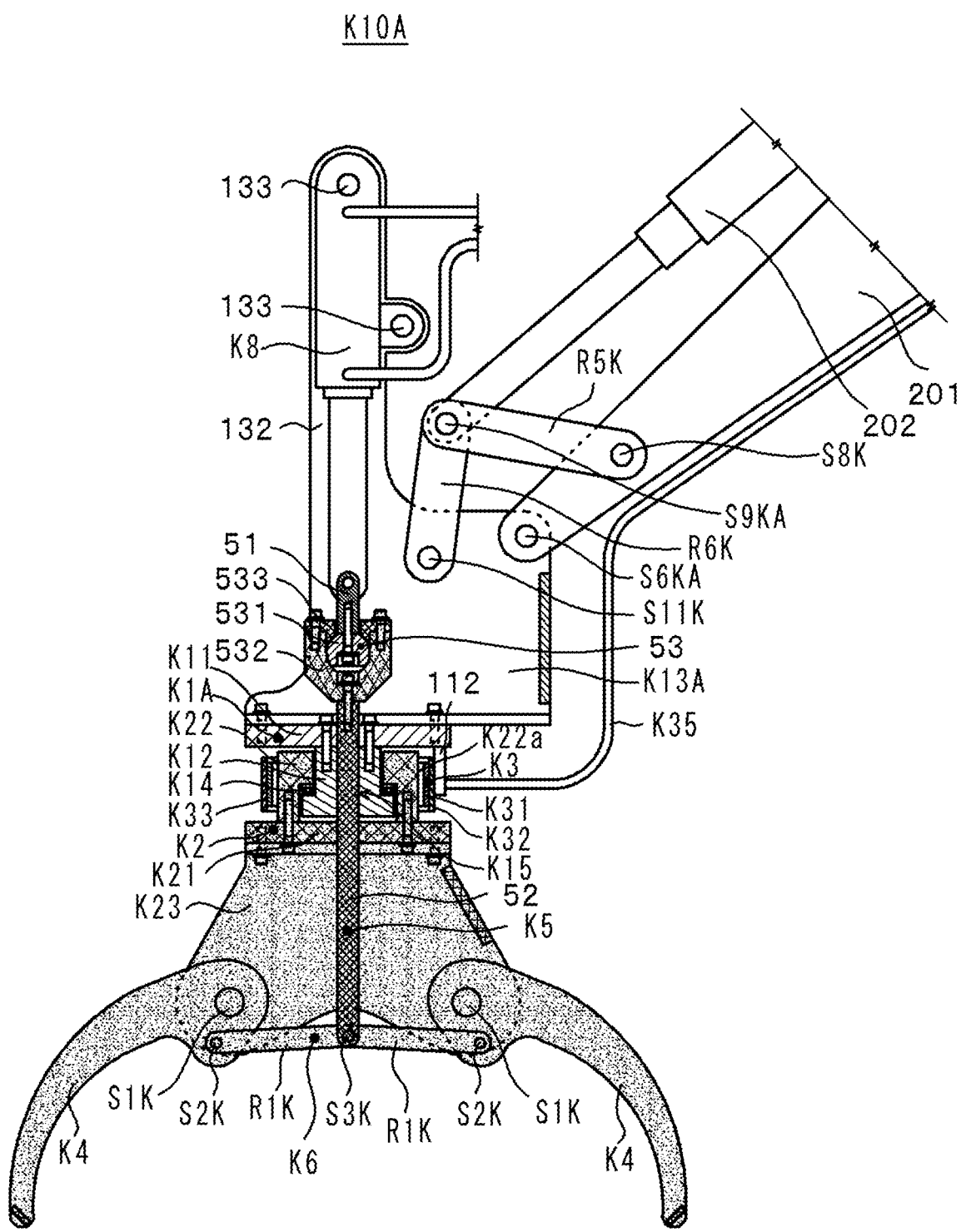
FIG. 16 is a partially sectional front view in a state where the claws of a grapple according to an eighth embodiment are opened.

As illustrated in FIG. 16, the body mounting bracket K13A deletes the elongated guide hole 131 from the upper frame K1A of the seventh embodiment and adds a tongue piece 132 for attaching the hydraulic or pneumatic claw cylinder K8 and two holes 133. The claw cylinder K8 is for directly applying a sliding force to the shaft portion K5 in the axial direction of the shaft portion K5.

The body mounting bracket K13A is rotatably pivotally supported on a distal end of the arm 201 by a sixth shaft S6KA. One end of the fifth link R5K is rotatably pivotally supported near the distal end of the arm 201 by the eighth shaft S8K, and the other end thereof is rotatably pivotally supported by a ninth shaft S9KA together with the distal end of the packet cylinder 202 and one end of the sixth link R6K.

The other end of the sixth link R6K is rotatably pivotally supported on the body mounting bracket K13A by an eleventh shaft S11K. This configuration allows the grapple K10A to perform bending and stretching motion by expansion and contraction of the packet cylinder 202.

The body mounting bracket K13A is configured such that the tongue piece 132 for fixing the shaft portion K5 extends and two holes 133 are disposed in the tongue piece 132. The claw cylinder K8 is fixed by the holes 133, and the distal end of the claw cylinder K8 is connected to the fixing shaft 51 of the shaft portion K5 by a fourth shaft S4KA.

The shaft portion K5 slides coaxially with a retractable shaft of the claw cylinder K8 and the claws K4 are opened and closed by expansion and contraction of the claw cylinder K8. The shaft portion K5 includes the rotating portion 53, and thus can rotate the claws K4 even if the claw cylinder K8 is fixed.

As described above, the grapple K10A includes the dedicated claw cylinder K8 and thus can perform a bending and stretching motion. Further, the claw cylinder K8 is disposed to perform a bending and stretching motion coaxially with the shaft portion K5, thus allowing a simple configuration without a link mechanism and providing a less expensive grapple K10A.

The coupling of the rotating portion 53 of the above embodiments is a coupling of a spherical surface. Thus, even if the axis of the fixing shaft 51 and the axis of the rotating shaft 52 are slightly inclined, the rotating portion 53 is rotatable. For example, the fitting gap between the ball case 532 contacting the coupling ball 531 and the spherical surface of the lid 533 may be reduced to provide a clearance between the other fitting gaps. Thus, even if the axis of the fixing shaft 51 and the axis of the rotating shaft 52 are slightly inclined due to a mounting error or the like, the rotating shaft 52 can be rotated without any trouble in sliding of the shaft portion K5.

Note that the contact surface for rotation of the rotating portion 53 is a spherical surface, but the present invention is not limited to this, and, for example, may a flat surface. Note also that the rotating portion 53 may be disposed in any position of the shaft portion K5. In the above embodiments, the shaft portion K5 includes the fixing shaft 51 and the rotating shaft 52, and the rotating portion 53 is disposed between the fixing shaft 51 and the rotating shaft 52, but may be disposed on an end portion of the shaft portion. More specifically, in the eighth embodiment, the coupling portion between the shaft portion K5 and the claw cylinder K8 may be configured to be rotatable or the coupling portion between the shaft portion K5 and the first link mechanism K6 may be configured to be rotatable.

Note that the grapple K10 of the above embodiments is configured not to have power such as a hydraulic motor for rotating the claws K4. The grapple, however, does not exclude a configuration of having power for rotating the claws K4 as long as the shaft portion is configured to have a rotating portion allowing the first link mechanism to be rotatable relative to the cylinder.

The above embodiments have been described using the grapple as a specific example of the attachment mounted on the distal end of the arm of the work vehicle, but the present invention is not limited to the grapple as the attachment mounted on the distal end of the arm of the work vehicle. The present invention may be applied to, for example, an attachment called a lifting magnet which is used in a demolition site or the like, and sucks and holds a magnetic workpiece as long as the attachment includes the lower frame holding the workpiece and the upper frame rotatably holding the lower frame.

The invention claimed is:

1. An attachment to be mounted to a distal end of a work vehicle arm having a lower frame holding a workpiece and an upper frame rotatably holding the lower frame, wherein the attachment comprises
   rotation braking means for braking rotation of the lower frame by an external force; and
   an operation unit for operating the rotation braking means,
   wherein the rotation breaking means is configured to apply the external force to an outer circumferential surface of the lower frame to brake the rotation of the lower frame.

2. The attachment to be mounted to a distal end of a work vehicle arm according to claim 1, wherein an adapter having a surface press-contacted by the rotation braking means is disposed on the lower frame.

3. The attachment to be mounted to a distal end of a work vehicle arm according to claim 1, wherein
   the lower frame has claws for gripping the workpiece and the attachment includes a grapple.

4. The attachment to be mounted to a distal end of a work vehicle arm according to claim 3, wherein
   the grapple comprises:
      a first link mechanism which is connected to the claws;
      a shaft portion which is connected to the first link mechanism, which is coaxial with a rotational axis of the claws, and which slides in the axial direction to open and close the claws; and
      a cylinder which applies a sliding force to the shaft portion directly or through a second link mechanism in the axial direction thereof, wherein
      the shaft portion comprises a rotating portion which causes the first link mechanism side to be rotatable relative to the cylinder side.

5. The attachment to be mounted to a distal end of a work vehicle arm according to claim 4, wherein
   the cylinder is an existing packet cylinder of a work vehicle pivotally supported on the arm and is connected to the shaft portion via the second link mechanism.

6. The attachment to be mounted to a distal end of a work vehicle arm according to claim 4, wherein
   the cylinder is directly connected to the shaft portion.

7. A work vehicle including an attachment having a lower frame holding a workpiece and an upper frame rotatably holding the lower frame, wherein
the attachment comprises
rotation braking means for braking rotation of the lower frame by an external force; and
an operation unit for operating the rotation braking means, and
the rotation breaking means is configured to apply the external force to an outer circumferential surface of the lower frame to brake the rotation of the lower frame.

8. The work vehicle including the attachment according to claim 7, comprising:
motor drive means for rotating the lower frame; and
motor drive stopping means for stopping driving the motor drive means, wherein the motor drive stopping means is configured to stop the motor drive means by causing the rotation braking means to apply braking to the rotation.

9. A brake for an attachment having a lower frame holding a workpiece and an upper frame rotatably holding the lower frame, the brake comprising:
rotation braking means for braking rotation of the lower frame by an external force; and
an operation unit for operating the rotation braking means,
wherein the rotation braking means is configured to be attached to the attachment by a mounted part, and
wherein the rotation breaking means is configured to apply the external force to an outer circumferential surface of the lower frame to brake the rotation of the lower frame.

* * * * *